US011704910B2

United States Patent
Endo et al.

(10) Patent No.: US 11,704,910 B2
(45) Date of Patent: Jul. 18, 2023

(54) VEHICLE DETECTING DEVICE AND VEHICLE LAMP SYSTEM

(71) Applicant: KOITO MANUFACTURING CO., LTD., Tokyo (JP)

(72) Inventors: Osamu Endo, Shizuoka (JP); Mitsuharu Mano, Shizuoka (JP); Takanori Namba, Shizuoka (JP); Masayasu Ito, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 292 days.

(21) Appl. No.: 16/992,911

(22) Filed: Aug. 13, 2020

(65) Prior Publication Data
US 2020/0369200 A1 Nov. 26, 2020

Related U.S. Application Data

(63) Continuation of application No. PCT/JP2019/004104, filed on Feb. 5, 2019.

(30) Foreign Application Priority Data

Feb. 15, 2018 (JP) .................................. 2018-024925
Feb. 15, 2018 (JP) .................................. 2018-024926
Feb. 15, 2018 (JP) .................................. 2018-024927

(51) Int. Cl.
*G06V 20/58* (2022.01)
*B60Q 1/14* (2006.01)
*G06V 10/25* (2022.01)

(52) U.S. Cl.
CPC ............. *G06V 20/58* (2022.01); *B60Q 1/143* (2013.01); *G06V 10/25* (2022.01); *G06V 20/584* (2022.01);
(Continued)

(58) Field of Classification Search
CPC .... G06V 10/255; G06V 10/60; G06V 20/584; G06V 10/25; G06V 20/58; B60Q 2300/41
See application file for complete search history.

(56) References Cited

U.S. PATENT DOCUMENTS 10,286,834 B2 * 5/2019 Ogawa ................. G06V 10/761
2014/0355280 A1 * 12/2014 Fujiyoshi ................ B60Q 1/04
362/465
(Continued)

FOREIGN PATENT DOCUMENTS

CN 102712284 B * 10/2016 ............. B60Q 1/085
JP 2011-037342 A 2/2011
(Continued)

OTHER PUBLICATIONS

International Preliminary Report on Patentability (Form PCT/IB/373) and the Written Opinion of the International Searching Authority (Form PCT/ISA/237) dated Aug. 18, 2020, in corresponding International Application No. PCT/JP2019/004104. (19 pages).
(Continued)

*Primary Examiner* — Christle I Marshall
(74) *Attorney, Agent, or Firm* — Buchanan Ingersoll & Rooney PC

(57) ABSTRACT

A vehicle detecting device includes a region setting unit that sets a plurality of regions of interest having different ranges on image data acquired from an image capturing device that captures an image of a space in front of a host vehicle; and a vehicle determining unit that determines, for each of the regions of interest, presence of a front vehicle based on a luminous point present in the region and that executes a determination at different frequencies in the respective regions of interest.

13 Claims, 8 Drawing Sheets

(52) U.S. Cl.
CPC ...... *B60Q 2300/13* (2013.01); *B60Q 2300/41* (2013.01)

(56) References Cited

U.S. PATENT DOCUMENTS

| | | | | |
|---|---|---|---|---|
| 2014/0355827 A1 * | 12/2014 | Ogawa | ................... | G06V 20/56 |
| | | | | 382/103 |
| 2017/0144585 A1 * | 5/2017 | Ogawa | ................ | G06V 20/584 |
| 2019/0031088 A1 | 1/2019 | Hiramatsu et al. | | |

FOREIGN PATENT DOCUMENTS

| | | | | |
|---|---|---|---|---|
| JP | 2011037342 A * | 2/2011 | | |
| JP | 2012-020662 A | 2/2012 | | |
| JP | 4914233 B2 * | 4/2012 | ......... | G06K 9/00825 |
| JP | 4914234 B2 * | 4/2012 | ......... | G06K 9/00825 |
| JP | 2013-060140 A | 4/2013 | | |
| JP | 2013060140 A * | 4/2013 | ............. | B60Q 1/143 |
| JP | 2015-051738 A | 3/2015 | | |
| JP | 2017-102743 A | 6/2017 | | |
| JP | 2017-124737 A | 7/2017 | | |
| KR | 101859201 B1 * | 5/2018 | | |
| WO | WO-2015114654 A1 * | 8/2015 | ......... | G06K 9/00798 |

OTHER PUBLICATIONS

International Search Report (Form PCT/ISA/210) dated May 7, 2019, in corresponding International Application No. PCT/JP2019/004104. (4 pages).

* cited by examiner

VEHICLE DETECTING DEVICE AND VEHICLE LAMP SYSTEM

CROSS-REFERENCE TO RELATED APPLICATIONS

This application is based upon and claims the benefit of priority from the prior Japanese Patent Application No. 2018-024925, filed on Feb. 15, 2018, the prior Japanese Patent Application No. 2018-024926, filed on Feb. 15, 2018, the prior Japanese Patent Application No. 2018-024927, filed on Feb. 15, 2018, and International Patent Application No. PCT/JP2019/004104, filed on Feb. 5, 2019, the entire content of each of which is incorporated herein by reference.

BACKGROUND OF THE INVENTION

1. Field of the Invention

The present invention relates to a vehicle detecting device and a vehicle lamp system.

2. Description of the Related Art

With adaptive driving beam (ADB) control proposed to date, a high-beam light distribution pattern is dynamically and adaptively controlled based on the conditions surrounding the vehicle. ADB control detects the presence of a front vehicle, such as a preceding vehicle or an oncoming vehicle, located to the front of the host vehicle and reduces or turns off the light illuminating the region corresponding to the detected front vehicle to reduce glare on the front vehicle. Thus, ADB control requires detection of a front vehicle. Meanwhile, for example, Patent Document 1 discloses a vehicle detecting device that includes another vehicle detecting means. This other vehicle detecting means detects other vehicles by analyzing time-series images capturing the region in front of the host vehicle.

[patent document 1] JP2012-020662

It is desired that ADB control be achieved with a simpler configuration. In one conceivable method that can simplify the configuration for ADB control, an element such as a simpler central processing unit (CPU) may be installed in a vehicle detecting device for detecting a front vehicle. On the other hand, a decrease in the accuracy of ADB control is certainly not desirable. However, the use of a simple element in a vehicle detecting device for the purpose of simplifying the configuration leads to a decrease in the accuracy in detecting a front vehicle, which in turn may result in a decrease in the accuracy of ADB control.

SUMMARY OF THE INVENTION

The present invention has been made in view of such a situation, and one of its objects is to provide a technique that can simplify the configuration for vehicle detection while maintaining its accuracy.

To solve the problem described above, an aspect of the present invention provides a vehicle detecting device. The device includes a region setting unit that sets a plurality of regions of interest having different ranges on image data acquired from an image capturing device that captures an image of a space in front of a host vehicle; and a vehicle determining unit that determines, for each of the regions of interest, presence of a front vehicle based on a luminous point present in the region and that executes a determination at different frequencies in the respective regions of interest.

Another aspect of the present invention also provides a vehicle detecting device. The device includes a region setting unit that sets a side region on image data acquired from an image capturing device that captures an image of a space in front of a host vehicle, the side region being located in a left side and/or a right side of the image data; and a vehicle determining unit that determines a passing vehicle based on a luminous point present in the side region in accordance with a determination standard for a tail lamp of another vehicle passing the host vehicle.

Another aspect of the present invention provides a vehicle detecting device. The device includes a region setting unit that sets an oncoming vehicle region based on a preceding vehicle at a predetermined distance on image data acquired from an image capturing device that captures an image of a space in front of a host vehicle; and a vehicle determining unit that determines that a luminous point present in the oncoming vehicle region represents an oncoming vehicle.

Another aspect of the present invention provides a vehicle detecting device. The device includes a region setting unit that sets a center region including a center of image data on the image data acquired from an image capturing device that captures an image of a space in front of a host vehicle; and a vehicle determining unit that determines that a luminous point present in the center region represents a front vehicle at a predetermined distance.

Another aspect of the present invention provides a vehicle lamp system. The system includes an image capturing device that captures an image of a space in front of a host vehicle; the vehicle detecting device according to any one of the above aspects; a light source device that is capable of independently controlling a luminous intensity of each light that illuminates a corresponding one of a plurality of individual regions arranged in front of the host vehicle; and a control device that controls illumination of each light from the light source device onto a corresponding one of the individual regions based on a detection result of the vehicle detecting device.

Any desired combination of the above constituent elements or an embodiment obtained by converting what is expressed by the present invention between a method, an apparatus, a system, and so on is also effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
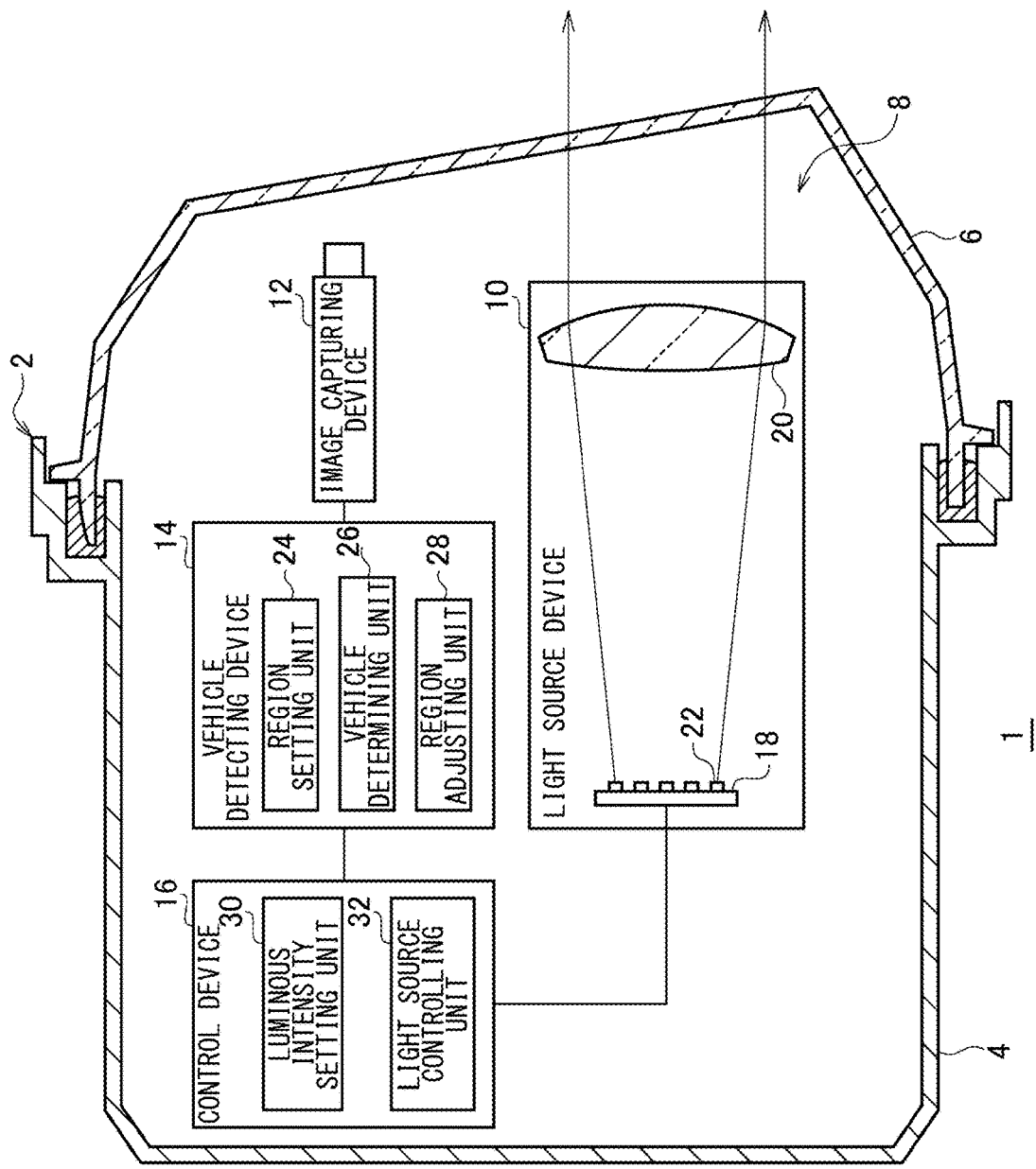
FIG. 1 illustrates a schematic configuration of a vehicle lamp system according to Embodiments 1 and 3.

An aspect of the present invention provides a vehicle detecting device. The device includes a region setting unit that sets a plurality of regions of interest having different ranges on image data acquired from an image capturing device that captures an image of a space in front of a host vehicle; and a vehicle determining unit that determines, for each of the regions of interest, presence of a front vehicle based on a luminous point present in the region and that executes a determination at different frequencies in the respective regions of interest. In the above aspect, the plurality of regions of interest may include at least one of a center region that includes a center of the image data, a side region that is located in a left side and/or a right side of the image data, an oncoming vehicle region that is determined based on a preceding vehicle at a predetermined distance, and a wide-angle region that excludes a determination exempt region located in an upper side of the image data. In the above aspect, a determination frequency may be higher in the center region, the oncoming vehicle region, and/or the wide-angle region than in the side region. In any one of the above aspects, the vehicle determining unit may execute a vehicle determination in accordance with different determination standards for the respective regions of interest.

Another aspect of the present invention also provides a vehicle detecting device. The device includes a region setting unit that sets a side region on image data acquired from an image capturing device that captures an image of a space in front of a host vehicle, the side region being located in a left side and/or a right side of the image data; and a vehicle determining unit that determines a passing vehicle based on a luminous point present in the side region in accordance with a determination standard for a tail lamp of another vehicle passing the host vehicle. In the above aspect, the determination standard may include a brightness, a size, and a color of a luminous point. In the above aspect, the determination standard may further include an amount of movement and/or an existing duration of a luminous point. In any one of the above aspects, the vehicle detecting device may further include a region adjusting unit that moves or changes a shape of the side region in response to a change in an attitude of the host vehicle and/or a change in a traveling environment.

Another aspect of the present invention provides a vehicle detecting device. The device includes a region setting unit that sets an oncoming vehicle region based on a preceding vehicle at a predetermined distance on image data acquired from an image capturing device that captures an image of a space in front of a host vehicle; and a vehicle determining unit that determines that a luminous point present in the oncoming vehicle region represents an oncoming vehicle. In the above aspect, the region setting unit may set a preceding vehicle region based on a luminous point that corresponds to a tail lamp of the preceding vehicle at a predetermined distance and set the oncoming vehicle region adjacent to the preceding vehicle region. In any one of the above aspects, the vehicle determining unit may hold a determination standard that states that a luminous point having a brightness, a size, and a color that correspond to those of a headlamp of an oncoming vehicle represents an oncoming vehicle. In the above aspect, the determination standard may further include an amount of movement and/or an existing duration of a luminous point. In any one of the above aspects, the determination standard may not include pairness of luminous points, a brightness gradient within a luminous point, or a shape of a luminous point.

Another aspect of the present invention provides a vehicle detecting device. The device includes a region setting unit that sets a center region including a center of image data on the image data acquired from an image capturing device that captures an image of a space in front of a host vehicle; and a vehicle determining unit that determines that a luminous point present in the center region represents a front vehicle at a predetermined distance. In the above aspect, the vehicle determining unit may hold a determination standard that states that a luminous point having a brightness, a size, and a color that correspond to those of a tail lamp of a preceding vehicle or a headlamp of an oncoming vehicle represents a front vehicle. In the above aspect, the determination standard may further include an amount of movement and/or an existing duration of a luminous point. In any one of the above aspects, the determination standard may not include pairness of luminous points, a brightness gradient within a luminous point, or a shape of a luminous point. In any one of the above aspects, the vehicle detecting device may further include a region adjusting unit that moves or changes a shape of the center region in response to a change in an attitude of the host vehicle and/or a change in a traveling environment.

Another aspect of the present invention provides a vehicle lamp system. The system includes an image capturing device that captures an image of a space in front of a host vehicle; the vehicle detecting device according to any one of the above aspects; a light source device that is capable of independently controlling a luminous intensity of each light that illuminates a corresponding one of a plurality of individual regions arranged in front of the host vehicle; and a control device that controls illumination of each light from the light source device onto a corresponding one of the individual regions based on a detection result of the vehicle detecting device.

Hereinafter, the present invention will be described based on some exemplary embodiments with reference to the drawings. The embodiments are illustrative in nature and are not intended to limit the invention. Not all the features and combinations thereof described in the embodiments are necessarily essential to the invention. Identical or equivalent constituent elements, members, and processes illustrated in the drawings are given identical reference characters, and duplicate descriptions thereof will be omitted as appropriate. The scales and the shapes of the components illustrated in the drawings are set merely for convenience in order to facilitate understanding of the descriptions and are not to be interpreted as limiting, unless specifically indicated otherwise. In addition, there may be a case where identical members are shown in slightly different scales or the like among the drawings. When terms such as "first" and "second" are used in the present specification and in the claims, these terms do not indicate the order or the levels of importance in any way and are merely used to distinguish a given configuration from another configuration, unless specifically indicated otherwise.

Embodiment 1

FIG. 1 illustrates a schematic configuration of a vehicle lamp system according to Embodiment 1. FIG. 1 depicts some of the constituent elements of a vehicle lamp system 1 in the form of functional blocks. These functional blocks are implemented by elements and circuits, including a CPU and a memory in a computer, in terms of the hardware configuration and implemented by a computer program or the like in terms of the software configuration. It is to be appreciated by a person skilled in the art that these functional blocks can be implemented in a variety of forms through combinations of hardware and software.

The vehicle lamp system 1 is applied to a vehicle headlamp apparatus that includes a pair of headlamp units disposed in the right and left sides of the front of a vehicle. The pair of headlamp units have structures that are roughly horizontally symmetric to each other and have substantially identical configurations. Therefore, a structure of one of the headlamp units is illustrated as a vehicle lamp 2 in FIG. 1.

The vehicle lamp 2 included in the vehicle lamp system 1 includes a lamp body 4 and a light-transmissive cover 6. The lamp body 4 has an opening in the front side of the vehicle. The light-transmissive cover 6 is so attached as to cover the opening of the lamp body 4. The lamp body 4 and the light-transmissive cover 6 form a lamp room 8. Housed in the lamp room 8 are a light source device 10, an image capturing device 12, a vehicle detecting device 14, and a control device 16.

(Light Source Device)

The light source device 10 can independently control the luminous intensity (intensity) of each light that illuminates a corresponding one of a plurality of individual regions arranged in front of the host vehicle. The light source device 10 includes a light source unit 18 and a projection optical member 20. Each component is attached to the lamp body 4 via a support mechanism (not illustrated).

The light source unit 18 has a structure in which a plurality of light sources 22 are arrayed, for example, and the on state of each light source 22 can be independently controlled. The on state includes the on/off and the intensity of the light. Examples of the light source 22 include a semiconductor light-emitting element, such as a light-emitting diode (LED), a laser diode (LD), or an electroluminescence (EL) element. The light sources 22 are associated with the respective individual regions. Controlling the on state of each light source 22 allows the light source device 10 to illuminate each individual region independently with light. Here, the light source unit 18 may have a structure in which a light source and an optical deflector, such as a digital mirror device (DMD), are combined.

The projection optical member 20 is constituted by a free-form surface lens having free-form front and back surfaces, for example. The projection optical member 20 projects an inverted image of a light source image that is formed in a posterior focal plane including a posterior focal point of the projection optical member 20 onto a space in front of the lamp. The projection optical member 20 is disposed with its posterior focal point lying in the vicinity of the light source unit 18. The lights emitted from the light sources 22 travel to the front of the lamp upon passing through the projection optical member 20 and illuminate the individual regions corresponding to the respective light sources 22. This causes a light-distribution pattern having a predetermined shape to be formed in front of the lamp.

(Image Capturing Device)

The image capturing device 12 captures an image of the space in front of the host vehicle. The image capturing device 12 is constituted by a well-known camera, for example. Here, each individual region may be a region that corresponds to a single pixel or a set of pixels of the image capturing device 12. Image data acquired by the image capturing device 12 is sent to the vehicle detecting device 14.

(Vehicle Detecting Device)

The vehicle detecting device 14 detects a front vehicle. A front vehicle refers to a vehicle present in front of the host vehicle, including a preceding vehicle that travels in the same direction as the host vehicle and an oncoming vehicle that travels in the opposite direction of the host vehicle. The vehicle detecting device 14 includes a region setting unit 24, a vehicle determining unit 26, and a region adjusting unit 28.

The region setting unit 24 sets a plurality of regions of interest ROI having different ranges on image data acquired from the image capturing device 12. A region of interest ROI is a region where a predetermined vehicle determination is made by the vehicle determining unit 26. The plurality of regions of interest ROI include at least one of a center region ROI1, a side region ROI2, an oncoming vehicle region ROI3, and a wide-angle region ROI4. Each region of interest ROI will be described in detail below.

(Center Region)

Figure 2:
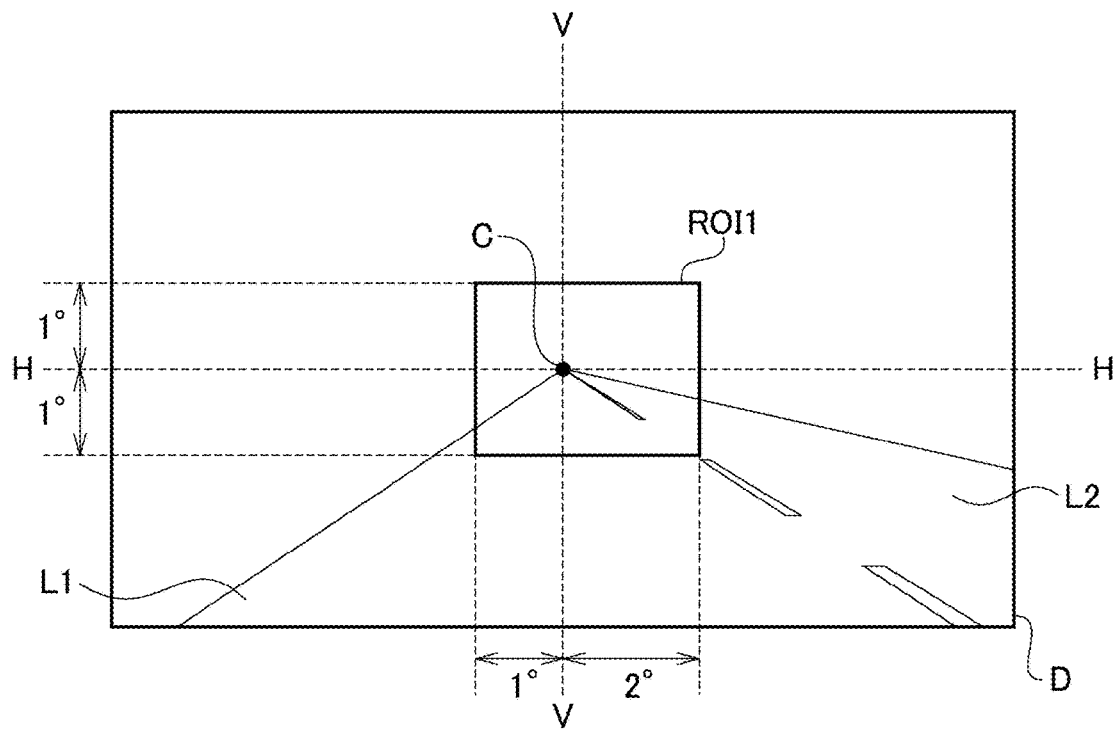
FIG. 2 illustrates a center region.

FIG. 2 illustrates the center region ROI1. The center region ROI1 includes a center C of image data D. The center C is a center of an image frame captured by the image capturing device 12. The center region ROI1 is set for the predominant purpose of detecting a front vehicle located at a predetermined distance. The center C of the image data D can be regarded as a vanishing point (an intersection of a horizontal line H and a vertical line V). In other words, the center C is an imaginary vanishing point. A host vehicle traveling lane L1 and an oncoming vehicle traveling lane L2 each extend downward from the vanishing point. Therefore, the center region ROI1 that includes the center C of the image data D can be estimated to be a region where a front vehicle located at a distance appears.

The range of the center region ROI1 can be set as appropriate based on an experiment or a simulation done by the designer in consideration of the balance between the required accuracy of ADB control and the load on the vehicle detecting device 14 in a vehicle detecting process. In one example, the center region ROI1 is rectangular, and its range extends one degree upward and one degree downward from the center C in the vertical direction. In addition, the range of the center region ROI1 extends one degree toward the host vehicle traveling lane L1 and two degrees toward the oncoming vehicle traveling lane L2 from the center C in the horizontal direction. It is preferable that the range of the center region ROI1 be wider in the oncoming vehicle traveling lane L2 than in the host vehicle traveling lane L1 from the center C. This enables earlier detection of an oncoming vehicle, which is more likely to experience glare.

(Side Region)

Figure 3:
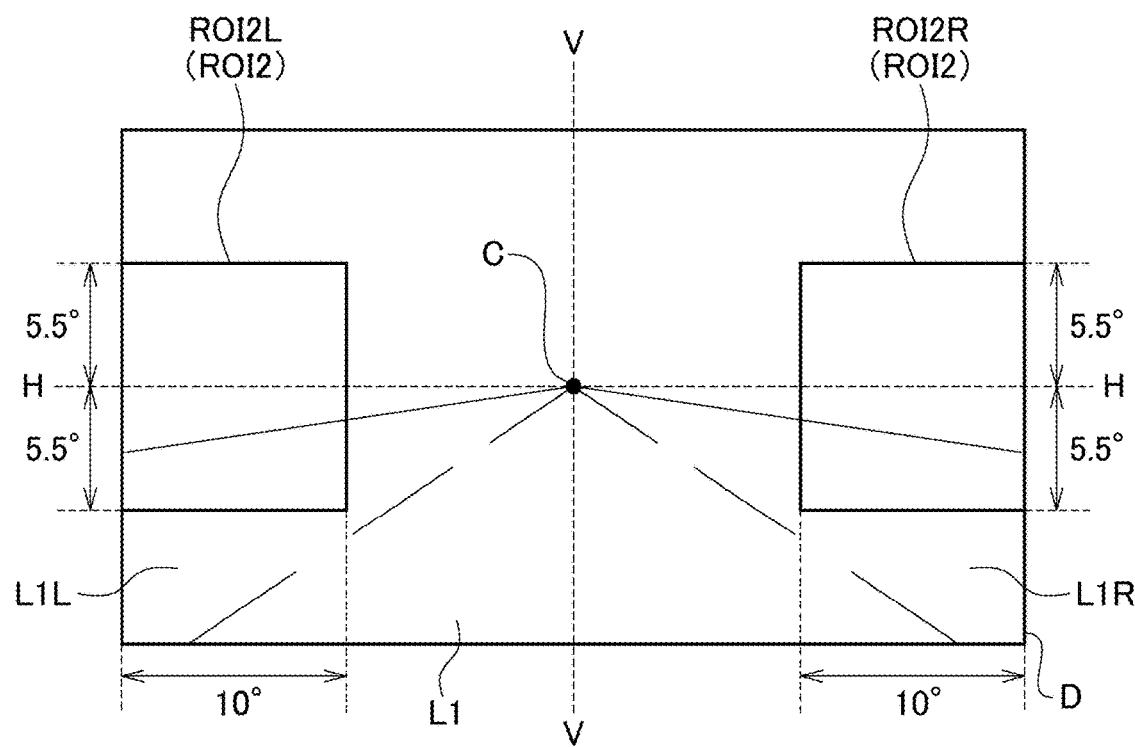
FIG. 3 illustrates a side region.

FIG. 3 illustrates the side region ROI2. The side region ROI2 is located in the left side and/or the right side of the image data D. FIG. 3 illustrates a left side region ROI2L located in the left side and a right side region ROI2R located in the right side. In the following, when the left side region ROI2L and the right side region ROI2R are not distinguished, they are collectively referred to as the side region(s) ROI2. The left side region ROI2L is set for the predominant purpose of detecting another vehicle that travels in a left side lane L1L of the host vehicle traveling lane L1 in the same direction as the host vehicle and that passes the host vehicle from behind on the left. The right side region ROI2R is set for the predominant purpose of detecting another vehicle that travels in a right side lane L1R of the host vehicle traveling lane L1 in the same direction as the host vehicle and that passes the host vehicle from behind on the right.

The side region ROI2 is set in reference to the center C with the center C of the image data D regarded as an imaginary vanishing point. The range of the side region ROI2 can be set as appropriate based on an experiment or a simulation done by the designer in consideration of the balance between the required accuracy of ADB control and the load on the vehicle detecting device 14 in a vehicle detecting process. In one example, the side region ROI2 is rectangular, and its range extends 5.5 degrees upward and 5.5 degrees downward from the center C in the vertical direction. The range of the side region ROI2 in the horizontal direction extends 10 degrees from an edge of the image data D in the horizontal direction.

(Oncoming Vehicle Region)

Figure 4:
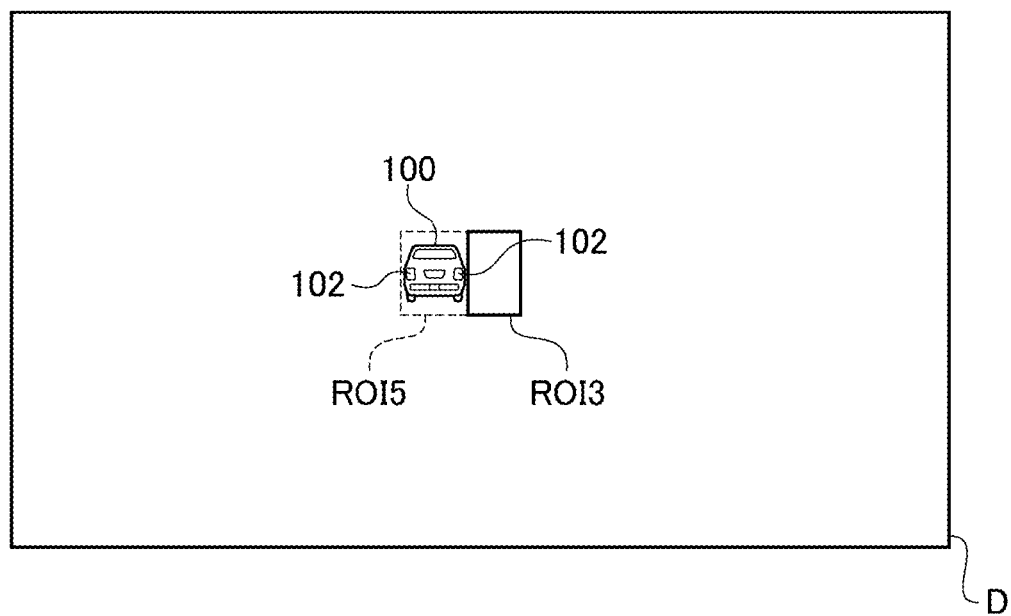
FIG. 4 illustrates an oncoming vehicle region.
Figure 5A:
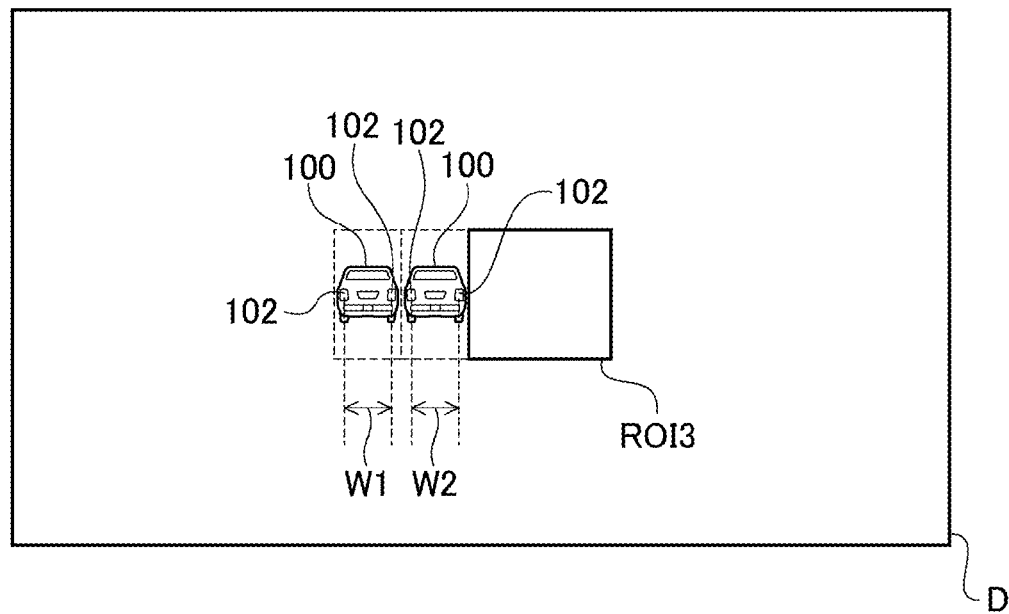
FIGS. 5A and 5B each illustrate an oncoming vehicle region.
Figure 5B:
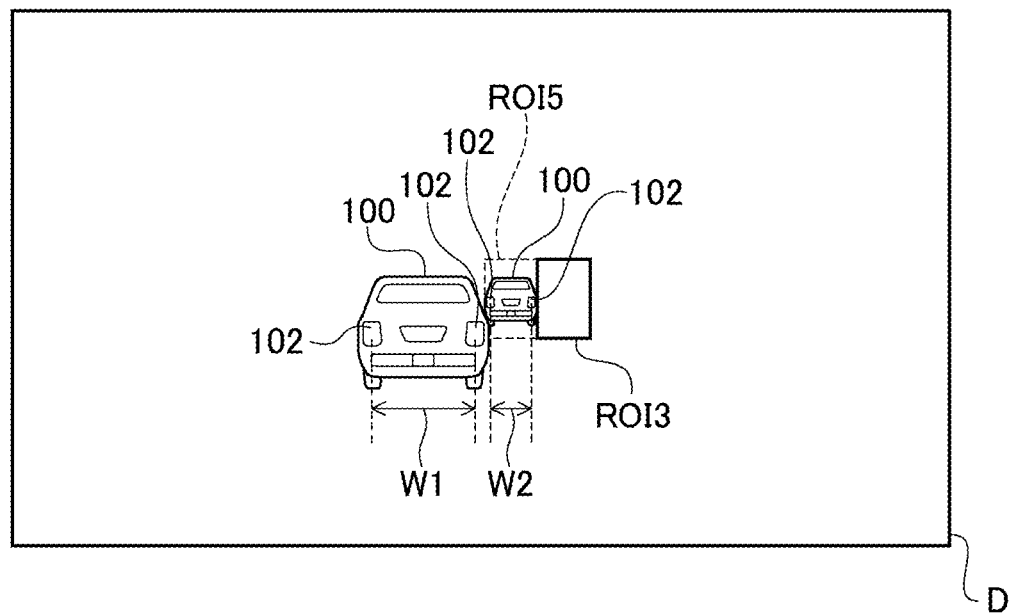

FIGS. 4, 5A, and 5B each illustrate the oncoming vehicle region ROI3. The oncoming vehicle region ROI3 is determined based on a preceding vehicle 100 at a predetermined distance. The oncoming vehicle region ROI3 is set for the predominant purpose of detecting an oncoming vehicle located at a predetermined distance.

The preceding vehicle 100 at a distance that serves as a reference for the oncoming vehicle region ROI3 is detected by the vehicle determining unit 26. The vehicle determining unit 26 can detect the preceding vehicle 100 with the use of a well-known method, including advanced image processing, algorithm recognition, and deep learning, for example. The vehicle determining unit 26 holds in advance feature points representing the preceding vehicle 100, for example. Then, the vehicle determining unit 26 recognizes the position of the preceding vehicle 100 if data including a feature point that represents the preceding vehicle 100 is present in the image data D.

One of the feature points that represent the preceding vehicle 100 is a pair of luminous points 102 corresponding to the tail lamps of the preceding vehicle 100, for example. That the preceding vehicle 100 is at a predetermined distance can be determined based on the gap or the like between the two luminous points 102. The detection result of the vehicle determining unit 26, that is, a signal indicating the positions of the two luminous points 102 determined to represent the preceding vehicle 100 is transmitted to the region setting unit 24.

As illustrated in FIG. 4, the region setting unit 24 sets a preceding vehicle region ROI5 based on the luminous points 102 corresponding to the tail lamps of the preceding vehicle 100 at a predetermined distance. Then, the region setting unit 24 sets the oncoming vehicle region ROI3 adjacent to the preceding vehicle region ROI5. In a case where the traffic laws require that vehicles travel on the left side of the road, the region setting unit 24 sets the oncoming vehicle region ROI3 on the right side of the preceding vehicle region ROI5. In a case where the traffic laws require that vehicles travel on the right side of the road, the region setting unit 24 sets the oncoming vehicle region ROI3 on the left side of the preceding vehicle region ROI5. Setting the oncoming vehicle region ROI3 in this manner allows the oncoming vehicle region ROI3 to be regarded as a region where an oncoming vehicle at a predetermined distance appears.

The range of the oncoming vehicle region ROI3 can be set as appropriate based on an experiment or a simulation done by the designer in consideration of the balance between the required accuracy of ADB control and the load on the vehicle detecting device 14 in a vehicle detecting process.

For example, the oncoming vehicle region ROI3 and the preceding vehicle region ROI5 are each rectangular. The region setting unit 24 holds in advance a conversion table in which the gap between the two luminous points 102 and the vertical and horizontal dimensions of the preceding vehicle region ROI5 are mapped to each other. The region setting unit 24 determines the vertical and horizontal dimensions of the preceding vehicle region ROI5 from the gap between the two luminous points 102 based on the conversion table and determines the position of the preceding vehicle region ROI5 based on the positions of the two luminous points 102.

Then, the region setting unit 24 sets the oncoming vehicle region ROI3 based on the preceding vehicle region ROI5. The region setting unit 24 matches the vertical dimension of the preceding vehicle region ROI5 (e.g., the dimension of the right-hand side in a case where the traffic laws require that vehicles travel on the left side of the road) to the vertical dimension of the oncoming vehicle region ROI3. In addition, the region setting unit 24 matches the horizontal dimension of the preceding vehicle region ROI5 (e.g., the dimension of the lower side) to the horizontal dimension of the oncoming vehicle region ROI3. Therefore, the shape of the oncoming vehicle region ROI3 changes in accordance with a change in the shape of the preceding vehicle region ROI5.

As illustrated in FIG. 5A, two preceding vehicles 100 traveling side by side may be detected by the vehicle determining unit 26. Such a situation may arise when, for example, the host vehicle is traveling on a road with multiple lanes in each direction. The vehicle determining unit 26 determines that the two preceding vehicles 100 are traveling side by side if two pairs of luminous points 102 appear side by side and a difference between a gap W1 between the pair of luminous points 102 located on the outer side of the road and a gap W2 between the pair of luminous points 102 located on the inner side of the road is within a predetermined range. The "predetermined range" can be set as appropriate by a person skilled in the art.

In this case, the region setting unit 24 determines the vertical and horizontal dimensions of the preceding vehicle region ROI5 based on the gap between the luminous point 102 located on the outermost side of the road and the luminous point 102 located on the innermost side of the road. In addition, the region setting unit 24 determines the position of the preceding vehicle region ROI5 based on the positions of these two luminous points 102. With this configuration, the dimensions and the position of the oncoming vehicle region ROI3 are so set as to fit an assumed situation where two oncoming vehicles are traveling side by side. Here, in a case where three or more preceding vehicles 100 are traveling side by side, the oncoming vehicle region ROI3 can be set through a similar procedure to that in the case of the two preceding vehicles 100.

Meanwhile, the vehicle determining unit 26 determines that two preceding vehicles 100 are traveling with one ahead of the other if two pairs of luminous points 102 appear side by side and a difference between the gap W1 between the pair of luminous points 102 located on the outer side of the road and the gap W2 between the pair of luminous points 102 located on the inner side of the road exceeds the predetermined range, as illustrated in FIG. 5B. In other words, the pair of luminous points 102 located on the inner side of the road represent the tail lamps of the preceding vehicle 100 ahead of the other of the two preceding vehicles 100, and the pair of luminous points 102 located on the outer side of the road represent the tail lamps of the preceding vehicle 100 following the other preceding vehicle 100.

In this case, the region setting unit 24 determines the vertical and horizontal dimensions of the preceding vehicle region ROI5 based on the gap W2 between the pair of luminous points 102 located on the inner side of the road. In addition, the region setting unit 24 determines the position of the preceding vehicle region ROI5 based on the positions of these two luminous points 102. Here, the vehicle determining unit 26 may also determine the size of each luminous point 102 when the vehicle determining unit 26 determines whether the preceding vehicles 100 are traveling side by side or traveling with one ahead of the other.

(Wide-Angle Region)

Figure 6:
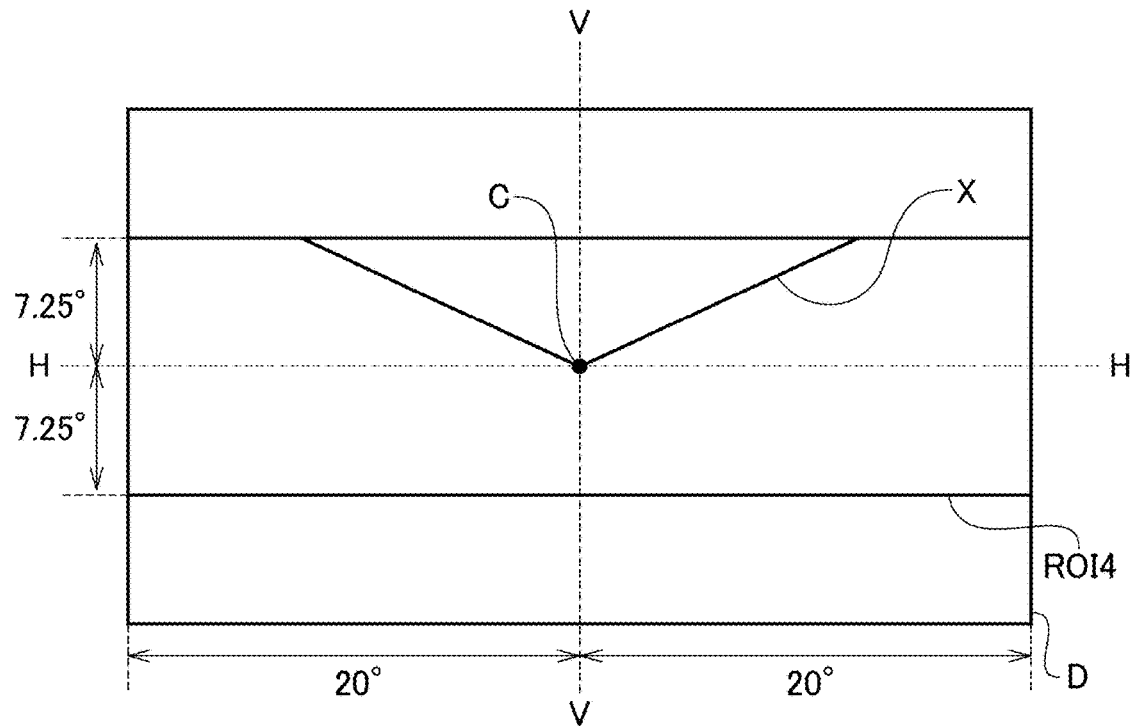
FIG. 6 illustrates a wide-angle region.

FIG. 6 illustrates the wide-angle region ROI4. The wide-angle region ROI4 is wider in the widthwise direction of the vehicle and excludes a determination exempt region X located in an upper side of the image data D. The wide-angle region ROI4 is set for the purpose of detecting any front vehicle with no detection priority associated with the position of the front vehicle. The wide-angle region ROI4 is set in reference to the center C with the center C of the image data D regarded as an imaginary vanishing point.

The wide-angle region ROI4 is a region excluding the determination exempt region X. The determination exempt region X is a region where luminous points representing things other than vehicles, such as a streetlight, are assumed to be present. For example, the determination exempt region X has a triangular shape that spreads in the upper right and left directions from the center C, or the imaginary vanishing point. The range of the determination exempt region X can be set as appropriate based on an experiment or a simulation done by the designer.

The range of the wide-angle region ROI4 can be set as appropriate based on an experiment or a simulation done by the designer in consideration of the balance between the required accuracy of ADB control and the load on the vehicle detecting device 14 in a vehicle detecting process. In one example, the range of the wide-angle region ROI4 extends 7.25 degrees upward and 7.25 degrees downward from the center C in the vertical direction and extends the entire region of the image data in the horizontal direction. In the present embodiment, the range of the wide-angle region ROI4 extends 20 degrees to the right and 20 degrees to the left from the center C in the horizontal direction.

As illustrated in FIG. 1, for each region of interest ROI, the vehicle determining unit 26 determines the presence of a front vehicle based on a luminous point present within the region. The vehicle determining unit 26 executes a vehicle determination in accordance with different determination standards for the respective regions of interest ROI. These determination standards can be stored in advance in the vehicle determining unit 26.

Specifically, for the center region ROI1, the vehicle determining unit 26 determines that a luminous point present in the center region ROI1 represents a front vehicle at a predetermined distance. In other words, the vehicle determining unit 26 holds a determination standard that states that any luminous point present in the center region ROI1 represents a front vehicle. Accordingly, when there is a luminous point in the center region ROI1, the vehicle determining unit 26 determines that this luminous point represents a front vehicle without analyzing whether this luminous point represents a headlamp or a tail lamp of a front vehicle through advanced image processing, algorithm recognition, deep learning, or the like. This can help reduce the load on the vehicle detecting device 14 in the vehicle detection process.

The vehicle determining unit 26 may hold a determination standard that states that a luminous point having the brightness, the size, and the color that correspond to those of a tail lamp of a preceding vehicle or a headlamp of an oncoming vehicle represents a front vehicle. In other words, the vehicle determining unit 26 analyzes whether a luminous point represents a lamp of a front vehicle only in terms of its brightness, size, and color. This case may lead to a slight increase in the load on the vehicle detecting device 14, but this determination standard can increase the accuracy in the vehicle determination than the determination standard that states that any luminous point present in the center region ROI1 represents a front vehicle.

The brightness, the size, and the color of a luminous point that correspond to those of a tail lamp of a preceding vehicle or a headlamp of an oncoming vehicle can be set as appropriate based on an experiment or a simulation done by the designer. In a case where the determination standard includes the brightness, the sensitivity of the vehicle determining unit 26 in detecting the brightness is so set as to detect the brightness corresponding to the brightness of a lamp of a front vehicle.

The determination standard may further include the amount of movement and/or the existing duration of a luminous point, in addition to the brightness, the size, and the color. This can help further increase the accuracy in the vehicle determination. The amount of movement and the existing duration of a luminous point that correspond to those of a tail lamp of a preceding vehicle or a headlamp of an oncoming vehicle can be set as appropriate based on an experiment or a simulation done by the designer.

Here, it is preferable that the determination standard do not include the pairness of luminous points, the brightness gradient within a luminous point, or the shape of a luminous point. This can help reduce the load on the vehicle detecting device 14 more reliably. The pairness of luminous points means that a plurality of luminous points behave in the same manner while maintaining their distance.

For the side region ROI2, the vehicle determining unit 26 determines a passing vehicle based on a luminous point present in the side region ROI2 in accordance with the determination standard for a tail lamp of another vehicle passing the host vehicle. This determination standard includes the brightness, the size, and the color of a luminous point. This determination standard may further include the amount of movement and/or the existing duration of a luminous point. The brightness, the size, the color, the amount of movement, and the existing duration of a luminous point that correspond to those of a tail lamp of another vehicle passing the host vehicle can be set as appropriate based on an experiment or a simulation done by the designer.

For the oncoming vehicle region ROI3, the vehicle determining unit 26 determines that a luminous point present in the oncoming vehicle region ROI3 represents an oncoming vehicle. In other words, the vehicle determining unit 26 holds a determination standard that states that any luminous point present in the oncoming vehicle region ROI3 represents an oncoming vehicle. Accordingly, when there is a luminous point in the oncoming vehicle region ROI3, the vehicle determining unit 26 determines that this luminous point represents an oncoming vehicle without analyzing whether this luminous point represents a headlamp of an oncoming vehicle through advanced image processing, algorithm recognition, deep learning, or the like. This can help reduce the load on the vehicle detecting device 14 in the vehicle detection process.

The vehicle determining unit 26 may hold a determination standard that states that a luminous point having the brightness, the size, and the color that correspond to those of a headlamp of an oncoming vehicle represents an oncoming vehicle. In other words, the vehicle determining unit 26 analyzes whether a luminous point represents a headlamp of an oncoming vehicle only in terms of its brightness, size, and color. This case may lead to a slight increase in the load on the vehicle detecting device 14, but this determination standard can increase the accuracy in the vehicle determination than the determination standard that states that any luminous point present in the oncoming vehicle region ROI3 represents an oncoming vehicle. The brightness, the size, and the color of a luminous point that correspond to those of a headlamp of an oncoming vehicle can be set as appropriate based on an experiment or a simulation done by the designer.

The determination standard may further include the amount of movement and/or the existing duration of a luminous point, in addition to the brightness, the size, and the color. This can help further increase the accuracy in the vehicle determination. The amount of movement and the existing duration of a luminous point that correspond to those of a headlamp of an oncoming vehicle can be set as appropriate based on an experiment or a simulation done by the designer.

Here, it is preferable that the determination standard do not include the pairness of luminous points, the brightness gradient within a luminous point, or the shape of a luminous point. This can help reduce the load on the vehicle detecting device 14 more reliably. The pairness of luminous points means that a plurality of luminous points behave in the same manner while maintaining their distance.

For the wide-angle region ROI4, the vehicle determining unit 26 determines a front vehicle based on a luminous point present in the wide-angle region ROI4 in accordance with a determination standard including, for example but not limited to, advanced image processing, algorithm recognition, and deep learning. The determination standard for the wide-angle region ROI4 includes the brightness, the size, the color, the amount of movement, the existing duration, the pairness, the luminance gradient, and the shape of a luminous point. Accordingly, a high-accuracy vehicle determination is performed in the wide-angle region ROI4, as compared to those in the center region ROI1, the side region ROI2, and the oncoming vehicle region ROI3.

For example, in the vehicle determination in the wide-angle region ROI4, it is determined whether the size of a luminous point present in the wide-angle region ROI4 is within the range of sizes that a luminous point corresponding to a lamp of a front vehicle can actually take. In contrast, in the center region ROI1 and the oncoming vehicle region ROI3, a luminous point present therein is determined to represent a vehicle regardless of the size of the luminous point. Therefore, although the load on the vehicle detecting device 14 is large in the vehicle determination in the wide-angle region ROI4, the above determination standard makes it possible to determine only a luminous point that is highly likely to represent a vehicle to be a vehicle. In other words, it is possible to focus on luminous points that are to be determined to represent a vehicle. In contrast, the frequency of false determination may increase in the vehicle determination in the center region ROI1 and the oncoming vehicle region ROI3, but the load on the vehicle detecting device 14 can be reduced.

In addition, even in a case where the size of a luminous point is included in the determination standard for the center region ROI1 and the oncoming vehicle region ROI3, the range is set wider than the range of sizes in the determination standard for the wide-angle region ROI4. Accordingly, even if a luminous point has a size that is not determined to represent a vehicle in the vehicle determination in the wide-angle region ROI4, this luminous point may be determined to represent a vehicle in the vehicle determination in the center region ROI1 and the oncoming vehicle region ROI3. With regard to the other determination standards, such as the brightness and the color, the conditions are less stringent for the center region ROI1 and the oncoming vehicle region ROI3 than for the wide-angle region ROI4. In one example, the preceding vehicle 100 that is to serve as a reference for the oncoming vehicle region ROI3 is detected through the vehicle determination in the wide-angle region ROI4.

The vehicle determining unit 26 executes the determination at different frequencies in the respective regions of interest ROI. Setting different determination frequencies in the respective regions of interest ROI in this manner makes it possible to achieve a processing design in which, for example, the determination frequency is set low in a region of interest ROI where a front vehicle appears relatively less frequently or the determination frequency is set high in a region of interest ROI where a front vehicle appears relatively more frequently. This enables efficient vehicle detection. As a result, the accuracy in detecting a front vehicle can be increased, and the load on the vehicle detecting device 14 can be reduced at the same time.

For example, the determination frequency is higher in the center region ROI1, the oncoming vehicle region ROI3, and/or the wide-angle region ROI4 than in the side region ROI2. Specifically, the vehicle determination is executed for each image frame acquired from the image capturing device 12 in the center region ROI1, the oncoming vehicle region ROI3, and/or the wide-angle region ROI4, and the vehicle determination is executed once per several frames in the side region ROI2. Alternatively, the determination frequency may be set higher in the oncoming vehicle region ROI3 than in the center region ROI1 and the wide-angle region ROI4. In one example, the regions of interest in which the vehicle determining unit 26 executes the determination are a combination of the center region ROI1 and/or the wide-angle region ROI4 and the side region ROI2 and/or the oncoming vehicle region ROI3.

Figure 7:
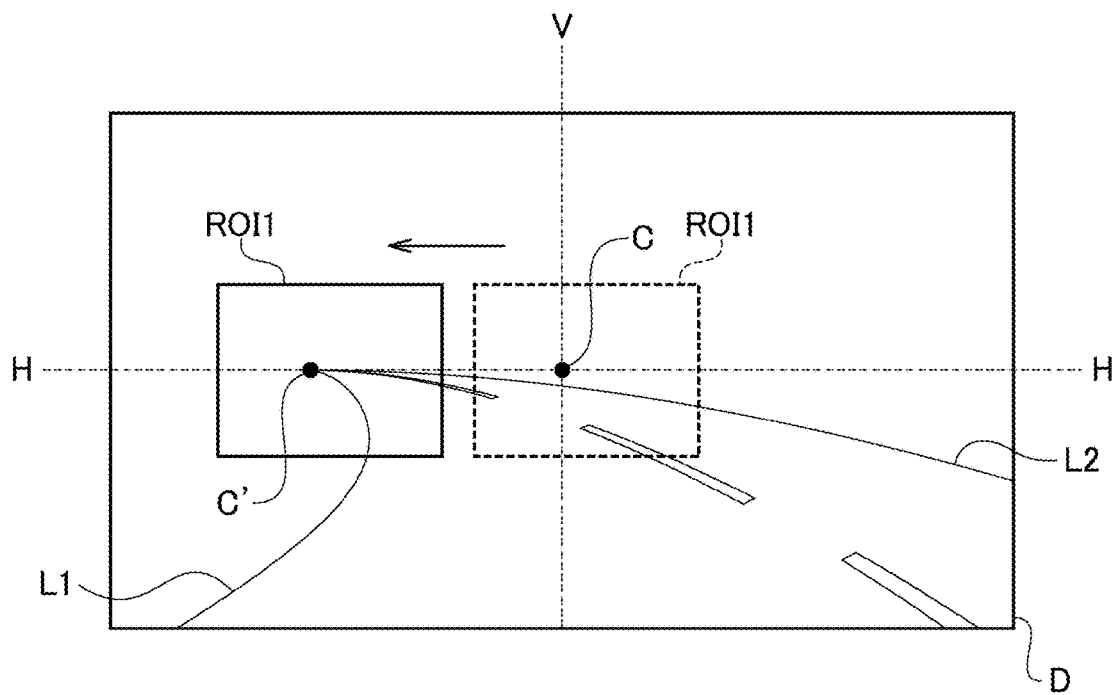
FIG. 7 illustrates how a center region is moved.

The region adjusting unit 28 moves or changes the shape of the center region ROI1 in response to a change in the attitude of the host vehicle and/or a change in the traveling environment. FIG. 7 illustrates how the center region ROI1 is moved. Examples of the change in the attitude of the host vehicle include a change in the attitude in the pitch direction or the yaw direction. Examples of the change in the traveling environment of the host vehicle include a case where the traveling route of the host vehicle changes from a straight route to a curved route and a case where the traveling route of the host vehicle changes from a horizontal route to an inclined route. The region adjusting unit 28 can detect a change in the attitude or a change in the traveling environment by receiving a signal from various sensors, such as a vehicle height sensor, a yaw sensor, an acceleration sensor, or a steering sensor, provided in the host vehicle or based on image data or the like acquired from the image capturing device 12.

As illustrated in FIG. 7, in a situation where the host vehicle is traveling along a curved route, for example, an actual vanishing point C' is displaced from the center C of the image data D in the traveling direction of the host vehicle. Yet, the center region ROI1 has its position range set with the center C of the image data D set as the imaginary vanishing point. Therefore, in a situation where the host vehicle is traveling along a curved route, the actual vanishing point may go out of the center region ROI1, that is, the center region ROI1 may go out of a region where a front vehicle at a predetermined distance appears.

In addressing the above, the region adjusting unit 28 moves the center region ROI1 in the direction of following the movement of the vanishing point associated with a change in the attitude or the traveling environment, or specifically, moves the center region ROI1 in the traveling direction of the host vehicle. This can reduce the possibility that the center region ROI1 goes out of the region where a front vehicle at a predetermined distance appears. The amount of movement of the center region ROI1 can be set in accordance with the amount of change in the output values of various sensors. For example, the amount of movement of the center region ROI1 and the output value of the steering sensor are mapped to each other, and the center region ROI1 is moved in accordance with the steering angle.

Figure 8:
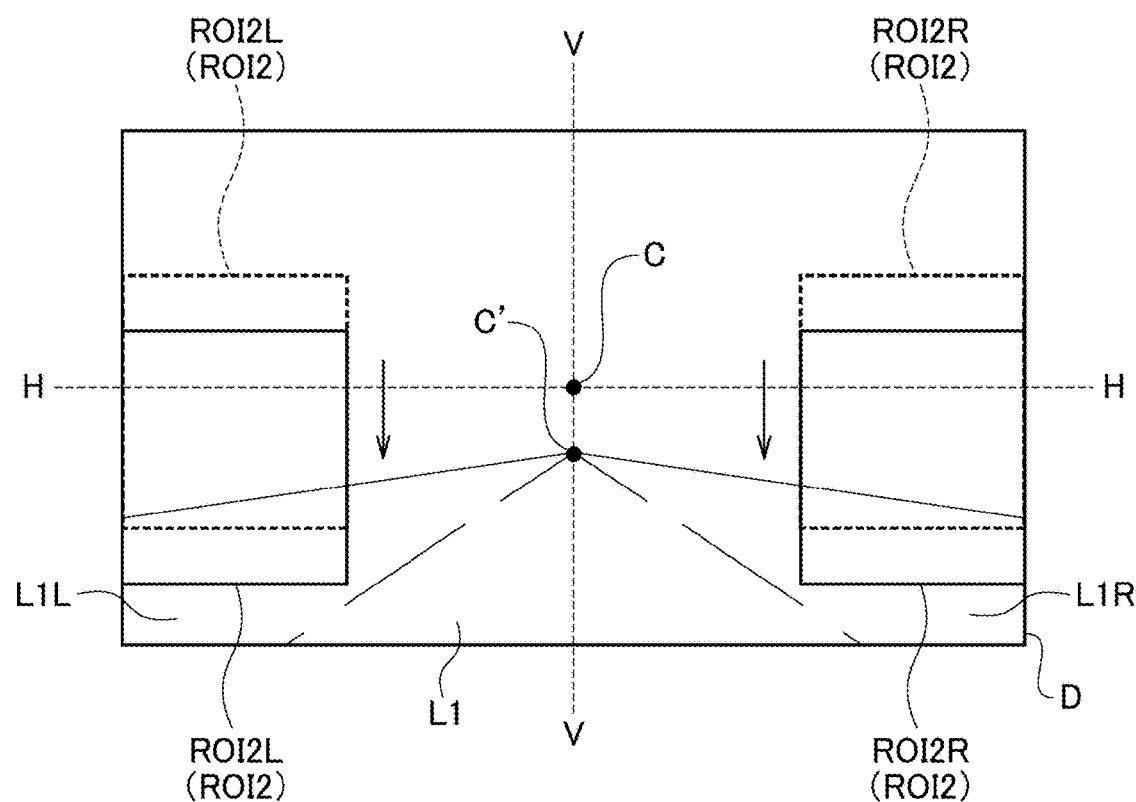
FIG. 8 illustrates how a side region is moved.

The region adjusting unit 28 also moves or changes the shape of the side region ROI2 in response to a change in the attitude of the host vehicle and/or a change in the traveling environment. FIG. 8 illustrates how the side region ROI2 is moved. As described above, examples of the change in the attitude of the host vehicle include a change in the attitude in the pitch direction or the yaw direction. Examples of the change in the traveling environment of the host vehicle include a change from a straight route to a curved route and a change from a horizontal route to an inclined route. The region adjusting unit 28 can detect a change in the attitude or a change in the traveling environment based on a signal received from various sensors provided in the host vehicle, image data, or the like.

As illustrated in FIG. 8, the attitude of the host vehicle may change to a backward tilted attitude, for example. In this situation, the actual vanishing point C' is displaced downward from the center C of the image data D. Yet, the side region ROI2 has its position range set with the center C of the image data D set as the imaginary vanishing point. Therefore, the side region ROI2 may fail to include a region where a passing vehicle appears.

In addressing the above, the region adjusting unit 28 moves the side region ROI2 in the direction of following the movement of the vanishing point associated with a change in the attitude or the traveling environment, or specifically, moves the side region ROI2 in the downward direction. This can reduce the possibility that the side region ROI2 goes out of a region where a passing vehicle appears. The amount of movement of the side region ROI2 can be set in accordance with the amount of change in the output values of various sensors. For example, the amount of movement of the side region ROI2 and the output value of the vehicle height sensor are mapped to each other, and the side region ROI2 is moved in accordance with the pitch angle of the vehicle.

Although not illustrated, the region adjusting unit 28 may also move or change the shape of the wide-angle region ROI4. For example, the region adjusting unit 28 moves the position of the wide-angle region ROI4 upward or downward in accordance with a change in the pitch angle of the host vehicle. In addition, the region adjusting unit 28 may change the shape of the wide-angle region ROI4 by moving or changing the shape of the determination exempt region X. For example, the region adjusting unit 28 moves the determination exempt region X in the right-left direction in accordance with the steering angle of the host vehicle while retaining the shape of the determination exempt region X. Alternatively, the region adjusting unit 28 bends or changes the tilt angle of the two sides extending obliquely upward from the vertex on the lower side of the triangle with the vertex fixed at the center C. This causes the shape of the wide-angle region ROI4 to change.

(Control Device)

As illustrated in FIG. 1, the control device 16 controls illumination of each light from the light source device 10 onto a corresponding one of the individual regions based on the detection result of the vehicle detecting device 14. The control device 16 includes a luminous intensity setting unit 30 and a light source controlling unit 32.

The luminous intensity setting unit 30 determines a luminous intensity value of each light that illuminates a corresponding one of the individual regions based on the detection result of the vehicle detecting device 14. The luminous intensity setting unit 30 sets the luminous intensity value for an individual region that overlaps a vehicle detected by the vehicle detecting device 14 to a value lower than those for other individual regions. For example, the luminous intensity setting unit 30 sets the luminous intensity value for an individual region that overlaps a vehicle to 0.

The light source controlling unit 32 controls the light source device 10 based on the luminous intensity value determined by the luminous intensity setting unit 30. Specifically, the light source controlling unit 32 controls the on state of each light source 22. This forms a light-distribution pattern having a shaded portion or a dimmed portion in a region where a front vehicle is present. With the configuration described above, the vehicle lamp system 1 can execute ADB control of forming an optimal light-distribution pattern in accordance with where a front vehicle is present.

As described above, the vehicle detecting device 14 according to the present embodiment includes the region setting unit 24 that sets a plurality of regions of interest ROI having different ranges on image data acquired from the image capturing device 12; and the vehicle determining unit 26 that determines, for each of the regions of interest ROI, whether a front vehicle is present based on a luminous point present in the region. The vehicle determining unit 26 executes the determination at different frequencies in the respective regions of interest ROI.

The vehicle lamp system 1 according to the present embodiment includes the image capturing device 12, the vehicle detecting device 14, the light source device 10 that can independently control the luminous intensity of each light that illuminates a corresponding one of a plurality of individual regions arranged in front of the host vehicle, and the control device 16 that controls illumination of each light from the light source device 10 onto a corresponding one of the individual regions.

The vehicle detecting device 14 according to the present embodiment enables efficient vehicle detection. Thus, the accuracy in detecting a front vehicle can be increased, and the load on the vehicle detecting device 14 that increases with an increase in the detection accuracy can be reduced at the same time. Since the load on the vehicle detecting device 14 can be reduced, an element such as an inexpensive CPU can be employed in the vehicle detecting device 14. This can simplify the configuration for vehicle detection while maintaining its accuracy. In addition, the use of such a vehicle detecting device 14 in the vehicle lamp system 1 can simplify the configuration for ADB control while maintaining its accuracy. As a result, the frequency of use of ADB control can be increased. Furthermore, the simplification of the configuration for implementing vehicle detection can reduce the cost required for vehicle detection and in turn for ADB control.

The plurality of regions of interest ROI set by the region setting unit 24 include at least one of the center region ROI1 that includes the center C of the image data D, the side region ROI2 that is located in the left side and/or the right side of the image data D, the oncoming vehicle region ROI3 that is determined based on a preceding vehicle at a predetermined distance, and the wide-angle region ROI4 that excludes the determination exempt region X located in the upper side of the image data D. Then, the vehicle determining unit 26 executes the determination in the center region ROI1, the oncoming vehicle region ROI3, and/or the wide-angle region ROI4 at a higher determination frequency than in the side region ROI2. This can help further increase the efficiency in the vehicle determination. As a result, simplification of the configuration required for the vehicle determination and the determination accuracy can be achieved at the same time at a higher level.

Furthermore, the vehicle determining unit 26 executes the vehicle determination in accordance with different determination standards for the respective regions of interest ROI. This can help even further increase the efficiency in the vehicle determination. As a result, simplification of the configuration required for the vehicle determination and the determination accuracy can be achieved at the same time at an even higher level.

The vehicle determining unit 26 determines that a luminous point present in the center region ROI1 represents a front vehicle at a predetermined distance. The center region ROI1 can be regarded as a region that is located on the extension line of the host vehicle and in which only vehicles may be present. Therefore, a luminous point detected in the center region ROI1 is highly likely to represent a front vehicle at a distance. In addition, it is very difficult to analyze whether a luminous point present in the center region ROI1 comes from a front vehicle at a distance because the luminous point provides only a small amount of information. Therefore, determining that any luminous point that is present in the center region ROI1 represents a front vehicle can reduce the load on the vehicle detecting device 14. In addition, since the load on the vehicle detecting device 14 can be reduced, an inexpensive CPU or the like can be employed in the vehicle detecting device 14.

Meanwhile, the above may lead to an increase in the number of false determinations. However, in ADB control, a false determination merely results in blockage or reduction of light in the falsely determined region. The center region ROI1 is simply a region where a vehicle at a distance is present, and even if light is blocked partially in the center region ROI1, this has little influence on the visibility for the driver. Therefore, the advantage gained by the reduction in the load on the vehicle detecting device 14 outweighs the disadvantage caused by a false determination. In addition, setting the center region ROI1 specialized for the detection of a front vehicle at a predetermined distance makes it possible to efficiently detect a front vehicle at a predetermined distance. This allows the resources of the vehicle determining unit 26 to be allocated to vehicle determinations in other regions, and thus the detection accuracy in the vehicle determination in the vehicle detecting device 14 as a whole can be maintained or increased.

For the center region ROI1, the vehicle determining unit 26 may hold a determination standard that states that a luminous point having the brightness, the size, and the color that correspond to those of a tail lamp of a preceding vehicle or a headlamp of an oncoming vehicle represents a front vehicle. This case may lead to a slight increase in the load on the vehicle detecting device 14, but the accuracy in the vehicle determination can be increased. This determination standard may further include the amount of movement and/or the existing duration of a luminous point. This can help further increase the accuracy in the vehicle determination. Preferably, the determination standard does not include the pairness of luminous points, the brightness gradient within a luminous point, or the shape of a luminous point. These determinations greatly increase the load on the vehicle detecting device 14. Therefore, excluding these determinations can help reduce the load on the vehicle detecting device 14 more reliably.

The vehicle determining unit 26 determines a passing vehicle based on a luminous point present in the side region ROI2 in accordance with the determination standard for a tail lamp of another vehicle passing the host vehicle. A passing vehicle is at a close distance from the host vehicle. Therefore, high-beam illumination may cause intense glare on the driver of a passing vehicle. In this respect, setting the side region ROI2 specialized for detecting a passing vehicle makes it possible to efficiently detect a passing vehicle. This can reduce the possibility of causing glare on the driver of a passing vehicle. In addition, the improvement in the efficiency in detecting a passing vehicle allows the resources of the vehicle determining unit 26 to be allocated to vehicle determinations in other regions. Thus, the detection accuracy in the vehicle determination in the vehicle detecting device 14 as a whole can be maintained or increased.

The determination standard for the side region ROI2 includes the brightness, the size, and the color of a luminous point that correspond to those of a tail lamp of another vehicle. This can help reduce the load on the vehicle detecting device 14 in the determination process while maintaining the accuracy in determining a passing vehicle. This determination standard may further include the amount of movement and/or the existing duration of a luminous point. This can help increase the determination accuracy. Meanwhile, preferably, the determination standard does not include the pairness of luminous points, the brightness gradient within a luminous point, or the shape of a luminous point. Excluding these determinations can help reduce the load on the vehicle detecting device 14 more reliably.

The vehicle determining unit 26 determines that a luminous point present in the oncoming vehicle region ROI3 represents an oncoming vehicle. The oncoming vehicle region ROI3 is set based on a preceding vehicle 100 at a predetermined distance. Specifically, the oncoming vehicle region ROI3 is set adjacent to the preceding vehicle region ROI5. The preceding vehicle region ROI5 is set based on luminous points corresponding to the tail lamps of the preceding vehicle 100 at a predetermined distance. Therefore, a luminous point detected in the oncoming vehicle region ROI3 is highly likely to represent an oncoming vehicle at a distance. In addition, it is very difficult to analyze whether a luminous point present in the oncoming vehicle region ROI3 comes from an oncoming vehicle at a distance because the luminous point provides only a small amount of information. Therefore, determining that any luminous point that is present in the oncoming vehicle region ROI3 represents an oncoming vehicle can reduce the load on the vehicle detecting device 14. Since the load on the vehicle detecting device 14 can be reduced, an element such as a more inexpensive CPU can be employed in the vehicle detecting device 14.

Meanwhile, the above may lead to an increase in the number of false determinations. However, in ADB control, a false determination merely results in blockage or reduction of light in the falsely determined region. The oncoming vehicle region ROI3 is simply a region where a vehicle at a distance is present, and even if light is blocked partially in the oncoming vehicle region ROI3, this has little influence on the visibility for the driver. Therefore, the advantage gained by the reduction in the load on the vehicle detecting device 14 outweighs the disadvantage caused by a false determination.

In addition, setting the oncoming vehicle region ROI3 specialized for the detection of an oncoming vehicle at a predetermined distance makes it possible to efficiently detect an oncoming vehicle at a predetermined distance. This allows the resources of the vehicle determining unit 26 to be allocated to vehicle determinations in other regions, and thus the detection accuracy in the vehicle determination in the vehicle detecting device 14 as a whole can be maintained or increased. In addition, the oncoming vehicle region ROI3 is smaller than the center region ROI1. Therefore, the frequency of false determinations can be reduced, as compared to the case of setting the center region ROI1.

For the oncoming vehicle region ROI3, the vehicle determining unit 26 may hold a determination standard that states that a luminous point having the brightness, the size, and the color that correspond to those of a headlamp of an oncoming vehicle represents an oncoming vehicle. This case may lead to a slight increase in the load on the vehicle detecting device 14, but the accuracy in the vehicle determination can be increased. This determination standard may further include the amount of movement and/or the existing duration of a luminous point. This can help further increase the accuracy in the vehicle determination. Preferably, the determination standard does not include the pairness of luminous points, the brightness gradient within a luminous point, or the shape of a luminous point. These determinations greatly increase the load on the vehicle detecting device 14. Therefore, excluding these determinations can help reduce the load on the vehicle detecting device 14 more reliably.

The vehicle detecting device 14 further includes the region adjusting unit 28. The region adjusting unit 28 moves or changes the shape of the center region ROI1, the side region ROI2, and the wide-angle region ROI4 in response to a change in the attitude of the host vehicle and/or a change in the traveling environment. This can help reduce an influence on the vehicle determination of the vehicle detecting device 14 that could be caused by a change in the attitude of the host vehicle or a change in the traveling environment. The oncoming vehicle region ROI3 is set based on the preceding vehicle region ROI5. Therefore, the oncoming vehicle region ROI3 does not need to be moved or have its shape changed in response to a change in the attitude or a change in the traveling environment.

The region setting unit 24 sets the center region ROI1, the side region ROI2, and the wide-angle region ROI4 with the center C of the image data D regarded as an imaginary vanishing point. Determining an actual vanishing point requires advanced image processing of the image data D. In contrast, regarding the center C as an imaginary vanishing point can help reduce the load on the vehicle detecting device 14.

Embodiment 2

Figure 9:
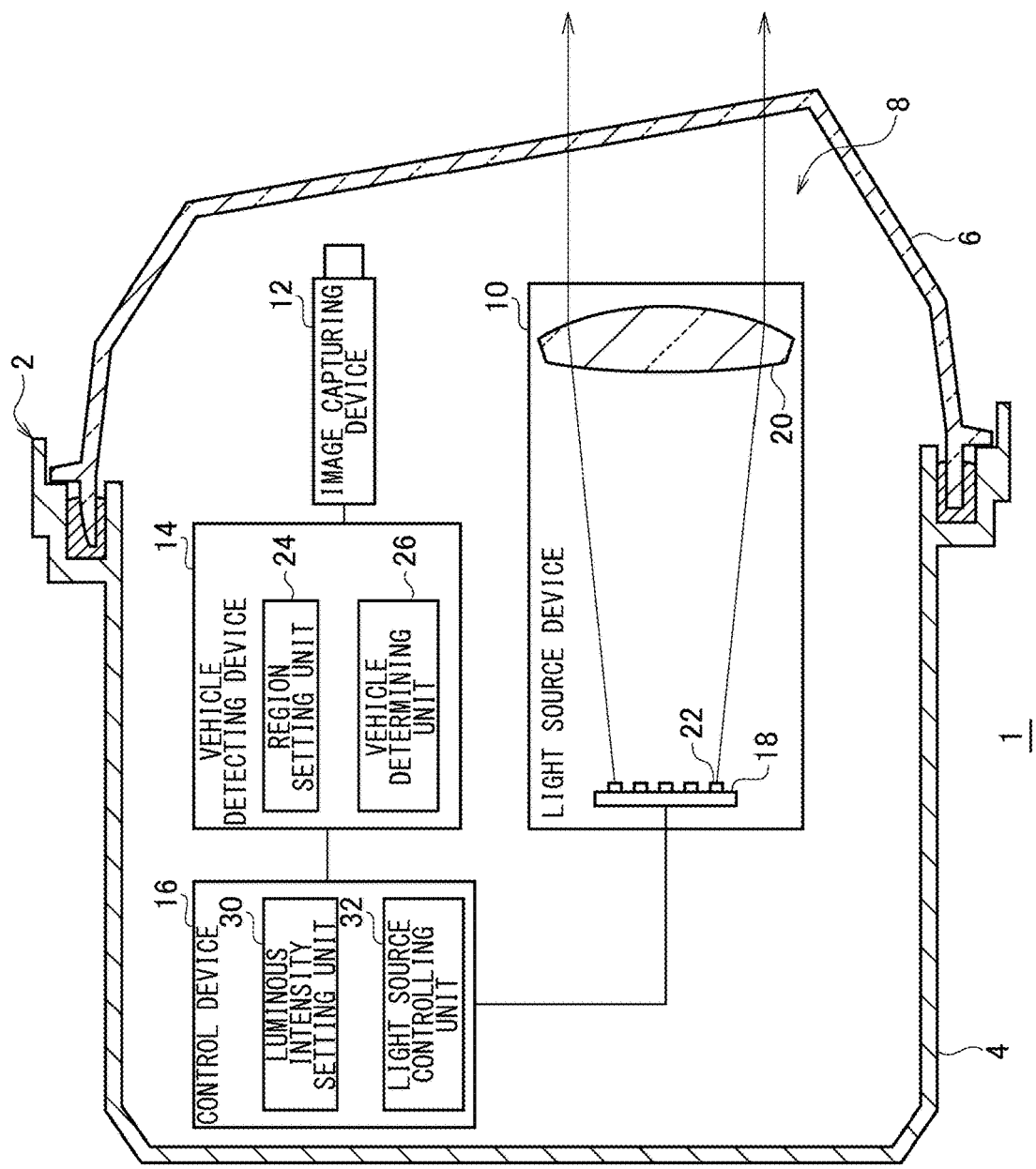
FIG. 9 illustrates a schematic configuration of a vehicle lamp system according to Embodiment 2.

FIG. 9 illustrates a schematic configuration of a vehicle lamp system according to Embodiment 2. FIG. 9 depicts some of the constituent elements of a vehicle lamp system 1 in the form of functional blocks. These functional blocks are implemented by elements and circuits, including a CPU and a memory in a computer, in terms of the hardware configuration and implemented by a computer program or the like in terms of the software configuration. It is to be appreciated by a person skilled in the art that these functional blocks can be implemented in a variety of forms through combinations of hardware and software.

The vehicle lamp system 1 is applied to a vehicle headlamp apparatus that includes a pair of headlamp units disposed in the right and left sides of the front of a vehicle. The pair of headlamp units have structures that are roughly horizontally symmetric to each other and have substantially identical configurations. Therefore, a structure of one of the headlamp units is illustrated as a vehicle lamp 2 in FIG. 9.

The vehicle lamp 2 included in the vehicle lamp system 1 includes a lamp body 4 and a light-transmissive cover 6. The lamp body 4 has an opening in the front side of the vehicle. The light-transmissive cover 6 is so attached as to cover the opening of the lamp body 4. The lamp body 4 and the light-transmissive cover 6 form a lamp room 8. Housed in the lamp room 8 are a light source device 10, an image capturing device 12, a vehicle detecting device 14, and a control device 16.

(Light Source Device)

The light source device 10 can independently control the luminous intensity (intensity) of each light that illuminates a corresponding one of a plurality of individual regions arranged in front of the host vehicle. The light source device 10 includes a light source unit 18 and a projection optical member 20. Each component is attached to the lamp body 4 via a support mechanism (not illustrated).

The light source unit 18 has a structure in which a plurality of light sources 22 are arrayed, for example, and the on state of each light source 22 can be independently controlled. The on state includes the on/off and the intensity of the light. Examples of the light source 22 include a semiconductor light-emitting element, such as an LED, an LD, or an EL element. The light sources 22 are associated with the respective individual regions. Controlling the on state of each light source 22 allows the light source device 10 to illuminate each individual region independently with light. Here, the light source unit 18 may have a structure in which a light source and an optical deflector, such as a DMD, are combined.

The projection optical member 20 is constituted by a free-form surface lens having free-form front and back surfaces, for example. The projection optical member 20 projects an inverted image of a light source image that is formed in a posterior focal plane including a posterior focal point of the projection optical member 20 onto a space in front of the lamp. The projection optical member 20 is disposed with its posterior focal point lying in the vicinity of the light source unit 18. The lights emitted from the light sources 22 travel to the front of the lamp upon passing through the projection optical member 20 and illuminate the individual regions corresponding to the respective light sources 22. This causes a light-distribution pattern having a predetermined shape to be formed in front of the lamp.

(Image Capturing Device)

The image capturing device 12 captures an image of the space in front of the host vehicle. The image capturing device 12 is constituted by a well-known camera, for example. Here, each individual region may be a region that corresponds to a single pixel or a set of pixels of the image capturing device 12. Image data acquired by the image capturing device 12 is sent to the vehicle detecting device 14.

Figure 10A:
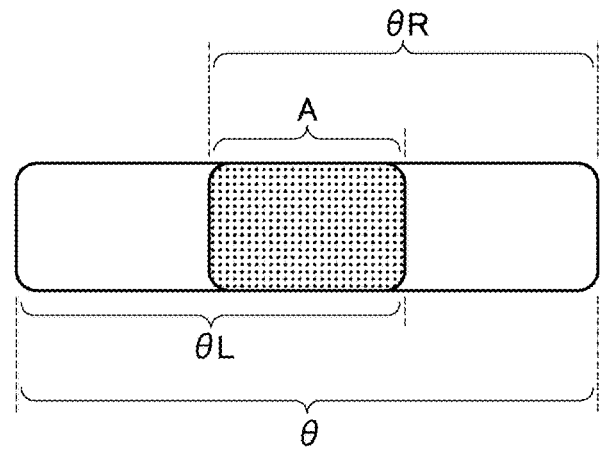
FIG. 10A schematically illustrates illumination ranges of right and left headlamp units, FIG. 10B schematically illustrates a relationship between an angle of view of an image capturing device and an illumination range of a light source device according to a reference example, and FIG. 10C schematically illustrates a relationship between an angle of view of an image capturing device and an illumination range of a light source device according to Embodiment 2.
Figure 10B:
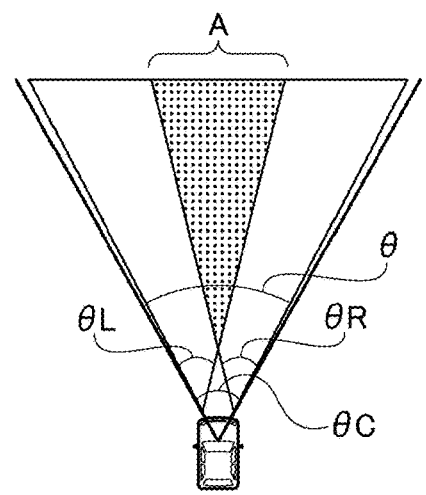
Figure 10C:
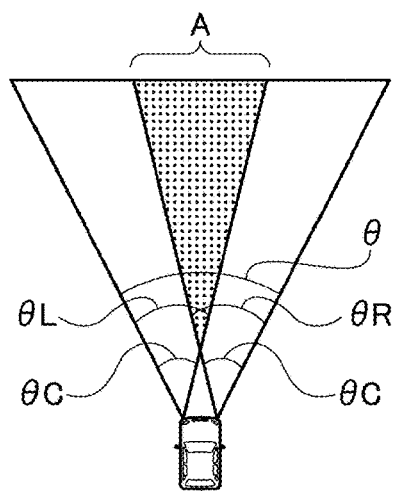

Now, a relationship between the angle of view of the image capturing device 12 and the illumination range of the light source device 10 will be described. FIG. 10A schematically illustrates the illumination ranges of the right and left headlamp units. FIG. 10B schematically illustrates a relationship between the angle of view of an image capturing device and an illumination range of a light source device according to a reference example. FIG. 10C schematically illustrates a relationship between the angle of view of the image capturing device and the illumination range of the light source device according to Embodiment 2.

There is a trade-off between the complexity of the configuration of the vehicle lamp system 1 and the accuracy in detecting a front vehicle, in particular, a front vehicle at a predetermined distance. In other words, the image capturing device 12 that includes a high-resolution camera or is equipped with a telephoto function can capture an image of a space at a distance from the host vehicle more clearly, and thus the accuracy in detecting a front vehicle increases. However, the image capturing device 12 with such higher functionality makes the configuration of the vehicle lamp system 1 more complex. The increased complexity of the configuration leads to an increase in the cost of the vehicle lamp system 1.

If the distance between the light source device 10 and the image capturing device 12 increases, for example, when the image capturing device 12 is mounted inside the vehicle compartment, for example, in the vicinity of the rearview mirror, the relative positional relationship of the light source device 10 and the image capturing device 12 may deviate from the design. In addition, the parallax between the light source device 10 and the image capturing device 12 increases. This may cause a mismatch between the position where a front vehicle is detected and the position of a shaded portion in the light-distribution pattern. To resolve such a mismatch between the position of a front vehicle and the position of a shaded portion, a mechanism needs to be provided that adjusts the position of the light source device 10 and/or the image capturing device 12 after the light source device 10 and/or the image capturing device 12 have/has been installed in a vehicle body. Furthermore, a computation process for correcting the parallax between the light source device 10 and the image capturing device 12 is required. In this computation process, the distance between the host vehicle and a front vehicle is measured with a radar or the like, for example. Then, the coordinates of shaded positions to be formed by the right and left headlamp units are computed from the detection pixels of the image capturing device 12.

Adding such position adjusting mechanism and computation process makes the configuration of the vehicle lamp system 1 more complex. Alternatively, instead of adding a position adjusting mechanism or a computation process to keep the configuration from becoming more complex, it is conceivable to set a wide margin for a shaded portion to reduce the possibility of causing glare on a front vehicle. However, increasing the margin for the shaded portion compromises the visibility for the driver of the host vehicle.

In addressing the issues described above, the vehicle lamp system 1 according to the present embodiment has the following configuration. First, it is desirable that the light distribution of the headlamp apparatus be bright at the center and have a light-distribution range as broad as possible. To this end, as illustrated in FIG. 10A, the left headlamp unit has a divergence angle θL (i.e., an illumination range) of the light that illuminates mainly a left side region of the space in front of the host vehicle. The right headlamp unit has a divergence angle θR of the light that illuminates mainly a right side region of the space in front of the host vehicle.

The divergence angle θL and the divergence angle θR partially overlap each other at the center in the widthwise direction of the vehicle to form an overlap region A. In addition, a combined divergence angle θ, where the right and left divergence angles are combined, covers the light-distribution range of the headlamp apparatus. This makes it possible to achieve illumination that is bright at the center and has a broad light-distribution range. For example, the combined divergence angle θ is 40 degrees, and the overlap region A spreads from 10 degrees to 20 degrees.

As illustrated in FIG. 10B, if the image capturing device is provided in the vicinity of the rearview mirror, the entire range of the combined divergence angle θ needs to be captured by the single image capturing device. Therefore, the angle of view θC of the image capturing device needs to be no smaller than the combined divergence angle θ. For example, in a case where the angle of view θC and the combined divergence angle θ are each 40 degrees and the image capturing device includes an imager having a horizontal resolution of 1280 pixels, the region covered by a single pixel at 100 meters ahead has a width of 5.7 cm. At this size, it is difficult to determine a vehicle at high accuracy based on a luminous point.

In contrast, as illustrated in FIG. 9, the vehicle lamp 2 according to the present embodiment includes the image capturing device 12 provided in the lamp room 8. Accordingly, the image capturing device 12 is provided in each of the right and left headlamp units in the vehicle lamp system 1. This allows the two image capturing devices 12 to jointly capture an image of the entire range of the combined divergence angle θ. Therefore, as illustrated in FIG. 10C, the angle of view θC of each of the right and left image capturing devices 12 can be set smaller than the combined divergence angle θ.

For example, the angle of view θC of each image capturing device 12 is set to 25 degrees to 30 degrees. With this configuration, when the combined divergence angle θ is 40 degrees and the image capturing device 12 includes an imager having a horizontal resolution of 1280 pixels, the region covered by a single pixel at 100 meters ahead has a width of 3.6 cm to 4.3 cm. This can help increase the accuracy in the vehicle determination based on a luminous point. In other words, the resolution can be increased even with the same imager.

In each headlamp unit, the light source device 10 and the image capturing device 12 are disposed inside the lamp room 8. In other words, the image capturing device 12 is disposed in the vicinity of the light source device 10. This makes it possible to reduce the parallax between the image capturing device 12 and the light source device 10. In addition, the image capturing device 12 and the light source device 10 can be fixed directly to each other or via a shared mounting structure. This makes it possible to reduce the relative positional mismatch between the image capturing device 12 and the light source device 10. Therefore, no position adjusting mechanism for the light source device 10 and/or the image capturing device 12 or no computation process for parallax correction needs to be added. Accordingly, the accuracy of ADB control can be increased while keeping the configuration of the vehicle lamp system 1 from becoming complex.

Preferably, the hardware configuration of the image capturing device 12, that is, the physical arrangement of the elements and so on constituting the image capturing device 12 is identical between the right and left headlamp units. In other words, the two headlamp units have largely horizontally symmetric structures, but the hardware configurations of the image capturing devices 12 are horizontally asymmetric. This makes it possible to reduce the number of devices required to manufacture the image capturing devices 12, and thus the manufacturing cost of the vehicle lamp system 1 can be reduced.

Preferably, in each of the right and left headlamp units, the positional relationship of the light source device 10 and the image capturing device 12 is set such that the optical axis of the light source device 10 substantially coincides with the imaging axis of the image capturing device 12. In addition, the positional relationship of the light source device 10 and the image capturing device 12 is set such that the divergence angles θL and θR of the lights from the light source device 10 substantially coincide with the angles of view θC of the respective image capturing devices 12. This allows each image capturing device 12 to capture an image of the entire illumination range of its corresponding light source device 10. Accordingly, the accuracy in detecting a front vehicle can be increased.

Preferably, the image capturing device 12 is disposed directly above or directly below the light source device 10 in the vertical direction. This allows the position of the image capturing device 12 and the position of the light source device 10 in the horizontal direction, or more specifically, the position of the imaging axis of the image capturing device 12 and the position of the optical axis of the light source device 10 in the horizontal direction to coincide with each other. As a result, the accuracy of ADB control can be increased.

The configuration described above makes it possible to capture an image of a space at a distance clearly without a high-resolution camera or a telephoto function provided in the image capturing device 12. In addition, the positional mismatch or the parallax between the light source device 10 and the image capturing device 12 can be reduced. Accordingly, the accuracy in detecting a front vehicle can be increased. In addition, the above configuration makes it possible to position a shaded portion or a dimmed portion in a light-distribution pattern onto a front vehicle with high accuracy.

(Vehicle Detecting Device)

As illustrated in FIG. 9, the vehicle detecting device 14 detects a front vehicle. A front vehicle refers to a vehicle present in front of the host vehicle, including a preceding vehicle that travels in the same direction as the host vehicle and an oncoming vehicle that travels in the opposite direction of the host vehicle. The vehicle detecting device 14 includes a region setting unit 24 and a vehicle determining unit 26.

The region setting unit 24 sets a predetermined region of interest ROI on image data acquired from the image capturing device 12. A region of interest ROI is a region where a predetermined vehicle determination is made by the vehicle determining unit 26. The region setting unit 24 according to the present embodiment sets an oncoming vehicle region ROI3.

FIGS. 4, 5A, and 5B each illustrate the oncoming vehicle region ROI3. The oncoming vehicle region ROI3 is determined based on a preceding vehicle at a predetermined distance. The oncoming vehicle region ROI3 is set for the predominant purpose of detecting an oncoming vehicle located at a predetermined distance.

The preceding vehicle 100 at a distance that serves as a reference for the oncoming vehicle region ROI3 is detected by the vehicle determining unit 26. The vehicle determining unit 26 can detect the preceding vehicle 100 with the use of a well-known method, including advanced image processing, algorithm recognition, and deep learning, for example. The vehicle determining unit 26 holds in advance feature points representing the preceding vehicle 100, for example. Then, the vehicle determining unit 26 recognizes the position of the preceding vehicle 100 if data including a feature point that represents the preceding vehicle 100 is present in the image data D.

One of the feature points that represent the preceding vehicle 100 is a pair of luminous points 102 corresponding to the tail lamps of the preceding vehicle 100, for example. That the preceding vehicle 100 is at a predetermined distance can be determined based on the gap or the like between the two luminous points 102. The detection result of the vehicle determining unit 26, that is, a signal indicating the positions of the two luminous points 102 determined to represent the preceding vehicle 100 is transmitted to the region setting unit 24.

As illustrated in FIG. 4, the region setting unit 24 sets a preceding vehicle region ROI5 based on the luminous points 102 corresponding to the tail lamps of the preceding vehicle 100 at a predetermined distance. Then, the region setting unit 24 sets the oncoming vehicle region ROI3 adjacent to the preceding vehicle region ROI5. In a case where the traffic laws require that vehicles travel on the left side of the road, the region setting unit 24 sets the oncoming vehicle region ROI3 on the right side of the preceding vehicle region ROI5. In a case where the traffic laws require that vehicles travel on the right side of the road, the region setting unit 24 sets the oncoming vehicle region ROI3 on the left side of the preceding vehicle region ROI5. Setting the oncoming vehicle region ROI3 in this manner allows the oncoming vehicle region ROI3 to be regarded as a region where an oncoming vehicle at a predetermined distance appears.

The range of the oncoming vehicle region ROI3 can be set as appropriate based on an experiment or a simulation done by the designer in consideration of the balance between the required accuracy of ADB control and the load on the vehicle detecting device 14 in a vehicle detecting process.

For example, the oncoming vehicle region ROI3 and the preceding vehicle region ROI5 are each rectangular. The region setting unit 24 holds in advance a conversion table in which the gap between the two luminous points 102 and the vertical and horizontal dimensions of the preceding vehicle region ROI5 are mapped to each other. The region setting unit 24 determines the vertical and horizontal dimensions of the preceding vehicle region ROI5 from the gap between the two luminous points 102 based on the conversion table and determines the position of the preceding vehicle region ROI5 based on the positions of the two luminous points 102.

Then, the region setting unit 24 sets the oncoming vehicle region ROI3 based on the preceding vehicle region ROI5. The region setting unit 24 matches the vertical dimension of the preceding vehicle region ROI5 (e.g., the dimension of the right-hand side in a case where the traffic laws require that vehicles travel on the left side of the road) to the vertical dimension of the oncoming vehicle region ROI3. In addition, the region setting unit 24 matches the horizontal dimension of the preceding vehicle region ROI5 (e.g., the dimension of the lower side) to the horizontal dimension of the oncoming vehicle region ROI3. Therefore, the shape of the oncoming vehicle region ROI3 changes in accordance with a change in the shape of the preceding vehicle region ROI5.

As illustrated in FIG. 5A, two preceding vehicles 100 traveling side by side may be detected by the vehicle determining unit 26. Such a situation may arise when, for example, the host vehicle is traveling on a road with multiple lanes in each direction. The vehicle determining unit 26 determines that the two preceding vehicles 100 are traveling side by side if two pairs of luminous points 102 appear side by side and a difference between a gap W1 between the pair of luminous points 102 located on the outer side of the road and a gap W2 between the pair of luminous points 102 located on the inner side of the road is within a predetermined range. The "predetermined range" can be set as appropriate by a person skilled in the art.

In this case, the region setting unit 24 determines the vertical and horizontal dimensions of the preceding vehicle region ROI5 based on the gap between the luminous point 102 located on the outermost side of the road and the luminous point 102 located on the innermost side of the road. In addition, the region setting unit 24 determines the position of the preceding vehicle region ROI5 based on the positions of these two luminous points 102. With this configuration, the dimensions and the position of the oncoming vehicle region ROI3 are so set as to fit an assumed situation where two oncoming vehicles are traveling side by side. Here, in a case where three or more preceding vehicles 100 are traveling side by side, the oncoming vehicle region ROI3 can be set through a similar procedure to that in the case of the two preceding vehicles 100.

Meanwhile, the vehicle determining unit 26 determines that two preceding vehicles 100 are traveling with one ahead of the other if two pairs of luminous points 102 appear side by side and a difference between the gap W1 between the pair of luminous points 102 located on the outer side of the road and the gap W2 between the pair of luminous points 102 located on the inner side of the road exceeds the predetermined range, as illustrated in FIG. 5B. In other words, the pair of luminous points 102 located on the inner side of the road represent the tail lamps of the preceding vehicle 100 ahead of the other of the two preceding vehicles 100, and the pair of luminous points 102 located on the outer side of the road represent the tail lamps of the preceding vehicle 100 following the other preceding vehicle 100.

In this case, the region setting unit 24 determines the vertical and horizontal dimensions of the preceding vehicle region ROI5 based on the gap W2 between the pair of luminous points 102 located on the inner side of the road. In addition, the region setting unit 24 determines the position of the preceding vehicle region ROI5 based on the positions of these two luminous points 102. Here, the vehicle determining unit 26 may also determine the size of each luminous point 102 when the vehicle determining unit 26 determines whether the preceding vehicles 100 are traveling side by side or traveling with one ahead of the other.

As illustrated in FIG. 9, the vehicle determining unit 26 determines, for the oncoming vehicle region ROI3, the presence of a front vehicle based on a luminous point present within the region. Specifically, the vehicle determining unit 26 determines that a luminous point present in the oncoming vehicle region ROI3 represents an oncoming vehicle. In other words, the vehicle determining unit 26 holds a determination standard that states that any luminous point present in the oncoming vehicle region ROI3 represents an oncoming vehicle. This determination standard can be stored in advance in the vehicle determining unit 26.

Accordingly, when there is a luminous point in the oncoming vehicle region ROI3, the vehicle determining unit 26 determines that this luminous point represents an oncoming vehicle without analyzing whether this luminous point represents a headlamp of an oncoming vehicle through advanced image processing, algorithm recognition, deep learning, or the like. This can help reduce the load on the vehicle detecting device 14 in the vehicle detection process.

The vehicle determining unit 26 may hold a determination standard that states that a luminous point having the brightness, the size, and the color that correspond to those of a headlamp of an oncoming vehicle represents an oncoming vehicle. In other words, the vehicle determining unit 26 analyzes whether a luminous point represents a headlamp of an oncoming vehicle only in terms of its brightness, size, and color. This case may lead to a slight increase in the load on the vehicle detecting device 14, but this determination standard can increase the accuracy in the vehicle determination than the determination standard that states that any luminous point present in the oncoming vehicle region ROI3 represents an oncoming vehicle.

The brightness, the size, and the color of a luminous point that correspond to those of a headlamp of an oncoming vehicle can be set as appropriate based on an experiment or a simulation done by the designer. In a case where the determination standard includes the brightness, the sensitivity of the vehicle determining unit 26 in detecting the brightness is so set as to detect the brightness corresponding to the brightness of a headlamp of an oncoming vehicle.

The determination standard may further include the amount of movement and/or the existing duration of a luminous point, in addition to the brightness, the size, and the color. This can help further increase the accuracy in the vehicle determination. The amount of movement and the existing duration of a luminous point that correspond to those of a headlamp of an oncoming vehicle can be set as appropriate based on an experiment or a simulation done by the designer.

Here, it is preferable that the determination standard do not include the pairness of luminous points, the brightness gradient within a luminous point, or the shape of a luminous point. This can help reduce the load on the vehicle detecting device 14 more reliably. The pairness of luminous points means that a plurality of luminous points behave in the same manner while maintaining their distance. In detecting the preceding vehicle 100, the pairness of luminous points, the brightness gradient within a luminous point, and the shape of a luminous point are determined.

(Control Device)

The control device 16 controls illumination of each light from the light source device 10 onto a corresponding one of the individual regions based on the detection result of the vehicle detecting device 14. The control device 16 includes a luminous intensity setting unit 30 and a light source controlling unit 32.

The luminous intensity setting unit 30 determines a luminous intensity value of each light that illuminates a corresponding one of the individual regions based on the detection result of the vehicle detecting device 14. The luminous intensity setting unit 30 sets the luminous intensity value for an individual region that overlaps a vehicle detected by the vehicle detecting device 14 to a value lower than those for other individual regions. For example, the luminous intensity setting unit 30 sets the luminous intensity value for an individual region that overlaps a vehicle to 0.

The light source controlling unit 32 controls the light source device 10 based on the luminous intensity value determined by the luminous intensity setting unit 30. Specifically, the light source controlling unit 32 controls the on state of each light source 22. This forms a light-distribution pattern having a shaded portion or a dimmed portion in a region where a front vehicle is present. With the configuration described above, the vehicle lamp system 1 can execute ADB control of forming an optimal light-distribution pattern in accordance with where a front vehicle is present.

As described above, the vehicle detecting device 14 according to the present embodiment includes the region setting unit 24 that sets the oncoming vehicle region ROI3 based on the preceding vehicle 100 at a predetermined distance on the image data D acquired from the image capturing device 12, and the vehicle determining unit 26 that determines that a luminous point present in the oncoming vehicle region ROI3 represents an oncoming vehicle.

The vehicle lamp system 1 according to the present embodiment includes the image capturing device 12, the vehicle detecting device 14, the light source device 10 that can independently control the luminous intensity of each light that illuminates a corresponding one of a plurality of individual regions arranged in front of the host vehicle, and the control device 16 that controls illumination of each light from the light source device 10 onto a corresponding one of the individual regions.

The vehicle detecting device 14 determines that any luminous point detected in the oncoming vehicle region ROI3 represents an oncoming vehicle at a distance. The oncoming vehicle region ROI3 is set adjacent to the preceding vehicle region ROI5. The preceding vehicle region ROI5 is set based on luminous points corresponding to the tail lamps of the preceding vehicle 100 at a predetermined distance. Therefore, a luminous point detected in the oncoming vehicle region ROI3 is highly likely to represent an oncoming vehicle at a distance. In addition, it is very difficult to analyze whether a luminous point present in the oncoming vehicle region ROI3 comes from an oncoming vehicle at a distance because the luminous point provides only a small amount of information. Therefore, determining that any luminous point that is present in the oncoming vehicle region ROI3 represents an oncoming vehicle can reduce the load on the vehicle detecting device 14. Since the load on the vehicle detecting device 14 can be reduced, an element such as a more inexpensive CPU can be employed in the vehicle detecting device 14.

Meanwhile, the above may lead to an increase in the number of false determinations. However, in ADB control, a false determination merely results in blockage or reduction of light in the falsely determined region. The oncoming vehicle region ROI3 is simply a region where a vehicle at a distance is present, and even if light is blocked partially in the oncoming vehicle region ROI3, this has little influence on the visibility for the driver. Therefore, the advantage gained by the reduction in the load on the vehicle detecting device 14 outweighs the disadvantage caused by a false determination.

In addition, setting the oncoming vehicle region ROI3 specialized for the detection of an oncoming vehicle at a predetermined distance makes it possible to efficiently detect an oncoming vehicle at a predetermined distance. This allows the resources of the vehicle determining unit 26 to be allocated to vehicle determinations in other regions, and thus the detection accuracy in the vehicle determination in the vehicle detecting device 14 as a whole can be maintained or increased. This can simplify the configuration for vehicle detection while maintaining its accuracy. In addition, the use of such a vehicle detecting device 14 in the vehicle lamp system 1 can simplify the configuration for ADB control while maintaining its accuracy. As a result, the frequency of use of ADB control can be increased. Furthermore, the simplification of the configuration for implementing vehicle detection can reduce the cost required for vehicle detection and in turn for ADB control.

The vehicle determining unit 26 may hold a determination standard that states that a luminous point having the brightness, the size, and the color that correspond to those of a headlamp of an oncoming vehicle represents an oncoming vehicle. This case may lead to a slight increase in the load on the vehicle detecting device 14, but the accuracy in the vehicle determination can be increased. This determination standard may further include the amount of movement and/or the existing duration of a luminous point. This can help further increase the accuracy in the vehicle determination. Preferably, the determination standard does not include the pairness of luminous points, the brightness gradient within a luminous point, or the shape of a luminous point. These determinations greatly increase the load on the vehicle detecting device 14. Therefore, excluding these determinations can help reduce the load on the vehicle detecting device 14 more reliably.

Embodiment 3

FIG. 1 illustrates a schematic configuration of a vehicle lamp system according to Embodiment 3. FIG. 1 depicts some of the constituent elements of a vehicle lamp system 1 in the form of functional blocks. These functional blocks are implemented by elements and circuits, including a CPU and a memory in a computer, in terms of the hardware configuration and implemented by a computer program or the like in terms of the software configuration. It is to be appreciated by a person skilled in the art that these functional blocks can be implemented in a variety of forms through combinations of hardware and software.

The vehicle lamp system 1 is applied to a vehicle headlamp apparatus that includes a pair of headlamp units disposed in the right and left sides of the front of a vehicle. The pair of headlamp units have structures that are roughly horizontally symmetric to each other and have substantially identical configurations. Therefore, a structure of one of the headlamp units is illustrated as a vehicle lamp 2 in FIG. 1.

The vehicle lamp 2 included in the vehicle lamp system 1 includes a lamp body 4 and a light-transmissive cover 6. The lamp body 4 has an opening in the front side of the vehicle. The light-transmissive cover 6 is so attached as to cover the opening of the lamp body 4. The lamp body 4 and the light-transmissive cover 6 form a lamp room 8. Housed in the lamp room 8 are a light source device 10, an image capturing device 12, a vehicle detecting device 14, and a control device 16.

(Light Source Device)

The light source device 10 can independently control the luminous intensity (intensity) of each light that illuminates a corresponding one of a plurality of individual regions arranged in front of the host vehicle. The light source device 10 includes a light source unit 18 and a projection optical member 20. Each component is attached to the lamp body 4 via a support mechanism (not illustrated).

The light source unit 18 has a structure in which a plurality of light sources 22 are arrayed, for example, and the on state of each light source 22 can be independently controlled. The on state includes the on/off and the intensity of the light. Examples of the light source 22 include a semiconductor light-emitting element, such as an LED, an LD, or an EL element. The light sources 22 are associated with the respective individual regions. Controlling the on state of each light source 22 allows the light source device 10 to illuminate each individual region independently with light. Here, the light source unit 18 may have a structure in which a light source and an optical deflector, such as a DMD, are combined.

The projection optical member 20 is constituted by a free-form surface lens having free-form front and back surfaces, for example. The projection optical member 20 projects an inverted image of a light source image that is formed in a posterior focal plane including a posterior focal point of the projection optical member 20 onto a space in front of the lamp. The projection optical member 20 is disposed with its posterior focal point lying in the vicinity of the light source unit 18. The lights emitted from the light sources 22 travel to the front of the lamp upon passing through the projection optical member 20 and illuminate the individual regions corresponding to the respective light sources 22. This causes a light-distribution pattern having a predetermined shape to be formed in front of the lamp.

(Image Capturing Device)

The image capturing device 12 captures an image of the space in front of the host vehicle. The image capturing device 12 is constituted by a well-known camera, for example. Here, each individual region may be a region that corresponds to a single pixel or a set of pixels of the image capturing device 12. Image data acquired by the image capturing device 12 is sent to the vehicle detecting device 14.

(Vehicle Detecting Device)

The vehicle detecting device 14 detects a front vehicle. A front vehicle refers to a vehicle present in front of the host vehicle, including a preceding vehicle that travels in the same direction as the host vehicle and an oncoming vehicle that travels in the opposite direction of the host vehicle. The vehicle detecting device 14 includes a region setting unit 24, a vehicle determining unit 26, and a region adjusting unit 28.

The region setting unit 24 sets a predetermined region of interest ROI on image data acquired from the image capturing device 12. A region of interest ROI is a region where a predetermined vehicle determination is made by the vehicle determining unit 26. The region setting unit 24 according to the present embodiment sets a center region ROI1.

FIG. 2 illustrates the center region ROI1. The center region ROI1 includes a center C of image data D. The center C is a center of an image frame captured by the image capturing device 12. The center region ROI1 is set for the predominant purpose of detecting a front vehicle located at a predetermined distance. The center C of the image data D can be regarded as a vanishing point (an intersection of a horizontal line H and a vertical line V). In other words, the center C is an imaginary vanishing point. A host vehicle traveling lane L1 and an oncoming vehicle traveling lane L2 each extend downward from the vanishing point. Therefore, the center region ROI1 that includes the center C of the image data D can be estimated to be a region where a front vehicle located at a distance appears.

The range of the center region ROI1 can be set as appropriate based on an experiment or a simulation done by the designer in consideration of the balance between the required accuracy of ADB control and the load on the vehicle detecting device 14 in a vehicle detecting process. In one example, the center region ROI1 is rectangular, and its range extends one degree upward and one degree downward from the center C in the vertical direction. In addition, the range of the center region ROI1 extends one degree toward the host vehicle traveling lane L1 and two degrees toward the oncoming vehicle traveling lane L2 from the center C in the horizontal direction. It is preferable that the range of the center region ROI1 be wider in the oncoming vehicle traveling lane L2 than in the host vehicle traveling lane L1 from the center C. This enables earlier detection of an oncoming vehicle, which is more likely to experience glare.

As illustrated in FIG. 1, the vehicle determining unit 26 determines, for the center region ROI1, the presence of a front vehicle based on a luminous point present within the region. Specifically, the vehicle determining unit 26 determines that a luminous point present in the center region ROI1 represents a front vehicle at a predetermined distance. In other words, the vehicle determining unit 26 holds a determination standard that states that any luminous point present in the center region ROI1 represents a front vehicle. This determination standard can be stored in advance in the vehicle determining unit 26.

Accordingly, when there is a luminous point in the center region ROI1, the vehicle determining unit 26 determines that this luminous point represents a front vehicle without analyzing whether this luminous point represents a headlamp or a tail lamp of a front vehicle through advanced image processing, algorithm recognition, deep learning, or the like. This can help reduce the load on the vehicle detecting device 14 in the vehicle detection process.

The vehicle determining unit 26 may hold a determination standard that states that a luminous point having the brightness, the size, and the color that correspond to those of a tail lamp of a preceding vehicle or a headlamp of an oncoming vehicle represents a front vehicle. In other words, the vehicle determining unit 26 analyzes whether a luminous point represents a lamp of a front vehicle only in terms of its brightness, size, and color. This case may lead to a slight increase in the load on the vehicle detecting device 14, but this determination standard can increase the accuracy in the vehicle determination than the determination standard that states that any luminous point present in the center region ROI1 represents a front vehicle. The brightness, the size, and the color of a luminous point that correspond to those of a tail lamp of a preceding vehicle or a headlamp of an oncoming vehicle can be set as appropriate based on an experiment or a simulation done by the designer. In a case where the determination standard includes the brightness, the sensitivity of the vehicle determining unit 26 in detecting the brightness is so set as to detect the brightness corresponding to the brightness of a lamp of a front vehicle.

The determination standard may further include the amount of movement and/or the existing duration of a luminous point, in addition to the brightness, the size, and the color. This can help further increase the accuracy in the vehicle determination. The amount of movement and the existing duration of a luminous point that correspond to those of a tail lamp of a preceding vehicle or a headlamp of an oncoming vehicle can be set as appropriate based on an experiment or a simulation done by the designer.

Here, it is preferable that the determination standard do not include the pairness of luminous points, the brightness gradient within a luminous point, or the shape of a luminous point. This can help reduce the load on the vehicle detecting device 14 more reliably. The pairness of luminous points means that a plurality of luminous points behave in the same manner while maintaining their distance.

The region adjusting unit 28 moves or changes the shape of the center region ROI1 in response to a change in the attitude of the host vehicle and/or a change in the traveling environment. FIG. 7 illustrates how the center region ROI1 is moved. Examples of the change in the attitude of the host vehicle include a change in the attitude in the pitch direction or the yaw direction. Examples of the change in the traveling environment of the host vehicle include a case where the traveling route of the host vehicle changes from a straight route to a curved route and a case where the traveling route of the host vehicle changes from a horizontal route to an inclined route. The region adjusting unit 28 can detect a change in the attitude or a change in the traveling environment by receiving a signal from various sensors, such as a vehicle height sensor, a yaw sensor, an acceleration sensor, or a steering sensor, provided in the host vehicle or based on image data or the like acquired from the image capturing device 12.

As illustrated in FIG. 7, in a situation where the host vehicle is traveling along a curved route, for example, an actual vanishing point C' is displaced from the center C of the image data D in the traveling direction of the host vehicle. Yet, the center region ROI1 has its position range set with the center C of the image data D set as the imaginary vanishing point. Therefore, in a situation where the host vehicle is traveling along a curved route, the actual vanishing point may go out of the center region ROI1, that is, the center region ROI1 may go out of a region where a front vehicle at a predetermined distance appears.

In addressing the above, the region adjusting unit 28 moves the center region ROI1 in the direction of following the movement of the vanishing point associated with a change in the attitude or the traveling environment, or specifically, moves the center region ROI1 in the traveling direction of the host vehicle. This can reduce the possibility that the center region ROI1 goes out of the region where a front vehicle at a predetermined distance appears. The amount of movement of the center region ROI1 can be set in accordance with the amount of change in the output values of various sensors. For example, the amount of movement of the center region ROI1 and the output value of the steering sensor are mapped to each other, and the center region ROI1 is moved in accordance with the steering angle.

(Control Device)

The control device 16 controls illumination of each light from the light source device 10 onto a corresponding one of the individual regions based on the detection result of the vehicle detecting device 14. The control device 16 includes a luminous intensity setting unit 30 and a light source controlling unit 32.

The luminous intensity setting unit 30 determines a luminous intensity value of each light that illuminates a corresponding one of the individual regions based on the detection result of the vehicle detecting device 14. The luminous intensity setting unit 30 sets the luminous intensity value for an individual region that overlaps a vehicle detected by the vehicle detecting device 14 to a value lower than those for other individual regions. For example, the luminous intensity setting unit 30 sets the luminous intensity value for an individual region that overlaps a vehicle to 0.

The light source controlling unit 32 controls the light source device 10 based on the luminous intensity value determined by the luminous intensity setting unit 30. Specifically, the light source controlling unit 32 controls the on state of each light source 22. This forms a light-distribution pattern having a shaded portion or a dimmed portion in a region where a front vehicle is present. With the configuration described above, the vehicle lamp system 1 can execute ADB control of forming an optimal light-distribution pattern in accordance with where a front vehicle is present.

As described above, the vehicle detecting device 14 according to the present embodiment includes the region setting unit 24 that sets the center region ROI1 including the center C of the image data D on the image data D acquired from the image capturing device 12, and the vehicle determining unit 26 that determines that a luminous point present in the center region ROI1 represents a front vehicle at a predetermined distance.

The vehicle lamp system 1 according to the present embodiment includes the image capturing device 12, the vehicle detecting device 14, the light source device 10 that can independently control the luminous intensity of each light that illuminates a corresponding one of a plurality of individual regions arranged in front of the host vehicle, and the control device 16 that controls illumination of each light from the light source device 10 onto a corresponding one of the individual regions.

The vehicle detecting device 14 determines that any luminous point present in the center region ROI1 represents a front vehicle at a predetermined distance. The center region ROI1 can be regarded as a region that is located on the extension line of the host vehicle and in which only vehicles may be present. Therefore, a luminous point detected in the center region ROI1 is highly likely to represent a front vehicle at a distance. In addition, it is very difficult to analyze whether a luminous point present in the center region ROI1 comes from a front vehicle at a distance because the luminous point provides only a small amount of information. Therefore, determining that any luminous point that is present in the center region ROI1 represents a front vehicle can reduce the load on the vehicle detecting device 14. In addition, since the load on the vehicle detecting device 14 can be reduced, an inexpensive CPU or the like can be employed in the vehicle detecting device 14.

Meanwhile, the above may lead to an increase in the number of false determinations. However, in ADB control, a false determination merely results in blockage or reduction of light in the falsely determined region. The center region ROI1 is simply a region where a vehicle at a distance is present, and even if light is blocked partially in the center region ROI1, this has little influence on the visibility for the driver. Therefore, the advantage gained by the reduction in the load on the vehicle detecting device 14 outweighs the disadvantage caused by a false determination.

In addition, setting the center region ROI1 specialized for the detection of a front vehicle at a predetermined distance makes it possible to efficiently detect a front vehicle at a predetermined distance. This allows the resources of the vehicle determining unit 26 to be allocated to vehicle determinations in other regions, and thus the detection accuracy in the vehicle determination in the vehicle detecting device 14 as a whole can be maintained or increased. This can simplify the configuration for vehicle detection while maintaining its accuracy. In addition, the use of such a vehicle detecting device 14 in the vehicle lamp system 1 can simplify the configuration for ADB control while maintaining its accuracy. As a result, the frequency of use of ADB control can be increased. Furthermore, the simplification of the configuration for implementing vehicle detection can reduce the cost required for vehicle detection and in turn for ADB control.

The vehicle determining unit 26 may hold a determination standard that states that a luminous point having the brightness, the size, and the color that correspond to those of a tail lamp of a preceding vehicle or a headlamp of an oncoming vehicle represents a front vehicle. This case may lead to a slight increase in the load on the vehicle detecting device 14, but the accuracy in the vehicle determination can be increased. This determination standard may further include the amount of movement and/or the existing duration of a luminous point. This can help further increase the accuracy in the vehicle determination. Preferably, the determination standard does not include the pairness of luminous points, the brightness gradient within a luminous point, or the shape of a luminous point. These determinations greatly increase the load on the vehicle detecting device 14. Therefore, excluding these determinations can help reduce the load on the vehicle detecting device 14 more reliably.

The vehicle detecting device 14 further includes the region adjusting unit 28. The region adjusting unit 28 moves or changes the shape of the center region ROI1 in response to a change in the attitude of the host vehicle and/or a change in the traveling environment. This can help reduce an influence on the vehicle determination of the vehicle detecting device 14 that could be caused by a change in the attitude of the host vehicle or a change in the traveling environment.

The region setting unit 24 sets the center region ROI1 with the center C of the image data D regarded as an imaginary vanishing point. Determining an actual vanishing point requires advanced image processing of the image data D. In contrast, regarding the center C as an imaginary vanishing point can help reduce the load on the vehicle detecting device 14.

The present invention is not limited to the embodiments described above. Modifications, including various design changes, can be made to the embodiments based on the knowledge of a person skilled in the art, and a new embodiment with such modifications is also encompassed by the scope of the present invention. Such a new embodiment has combined effects of those of the embodiments and the modifications that are combined. In addition, any desired combination of the constituent elements included in the embodiments is also effective as an embodiment of the present invention.

In the foregoing embodiments, the image capturing device 12, the vehicle detecting device 14, and the control device 16 are provided inside the lamp room 8, but they may be provided outside the lamp room 8, as appropriate. For example, an existing camera provided in a vehicle compartment may be used as the image capturing device 12.

What is claimed is:

1. A vehicle detecting device, comprising:
a first processor configured to set a plurality of regions of interest having different ranges on image data acquired from an imager that captures an image of a space in front of a host vehicle; and
a second processor configured to determine, for each of the regions of interest, a presence of a front vehicle based on a luminous point present in the region and that executes a determination at different frequencies in the respective regions of interest, wherein
the plurality of regions of interest include at least one of a center region that includes a center of the image data, a side region that is located in a left side and/or a right side of the image data, an oncoming vehicle region that is determined based on a preceding vehicle at a predetermined distance, and a wide-angle region that excludes a determination exempt region located in an upper side of the image data and
a determination frequency is higher in the center region, the oncoming vehicle region, and/or a wide-angle region than in the side region.

2. The vehicle detecting device according to claim 1, wherein
the second processor is configured to execute a vehicle determination in accordance with different determination standards for the respective regions of interest.

3. A vehicle lamp system, comprising:
an imager that captures an image of a space in front of a host vehicle;
the vehicle detecting device according to claim 1;
a fourth processor configured to independently control a luminous intensity of each light that illuminates a corresponding one of a plurality of individual regions arranged in front of the host vehicle; and
a fifth processor configured to control illumination of each light from the light source device onto a corresponding one of the individual regions based on a detection result of the vehicle detecting device.

4. A vehicle detecting device, comprising:
a first processor configured to set a side region on image data acquired from an imager that captures an image of a space in front of a host vehicle, the side region being located in a left side and/or a right side of the image data;
a second processor configured to determine a passing vehicle based on a luminous point present in the side region in accordance with a determination standard for a tail lamp of another vehicle passing the host vehicle; and
a third processor configured to move or change a shape of the side region in response to a change in an attitude of the host vehicle and/or a change in a traveling environment.

5. The vehicle detecting device according to claim 4, wherein
the determination standard includes a brightness, a size, and a color of a luminous point.

6. The vehicle detecting device according to claim 5, wherein
the determination standard further includes an amount of movement and/or an existing duration of a luminous point.

7. A vehicle detecting device, comprising:
a first processor configured to set an oncoming vehicle region based on a preceding vehicle at a predetermined distance on image data acquired from an imager that captures an image of a space in front of a host vehicle; and
a second processor configured to determine that a luminous point present in the oncoming vehicle region represents an oncoming vehicle, wherein
the second processor is configured to hold a determination standard that states that a luminous point having a brightness, a size, and a color that correspond to those of a headlamp of an oncoming vehicle represents an oncoming vehicle; and
the determination standard further includes an amount of movement and/or an existing duration of a luminous point.

8. The vehicle detecting device according to claim 7, wherein
the first processor is configured to set a preceding vehicle region based on a luminous point that corresponds to a tail lamp of the preceding vehicle at a predetermined distance and sets the oncoming vehicle region adjacent to the preceding vehicle region.

9. The vehicle detecting device according to claim 7, wherein the determination standard does not include pairness of luminous points, a brightness gradient within a luminous point, or a shape of a luminous point.

10. A vehicle detecting device, comprising:
- first processor configured to set a center region including a center of image data on the image data acquired from an imager that captures an image of a space in front of a host vehicle;
- a second processor configured to determine that a luminous point present in the center region represents a front vehicle at a predetermined distance; and
- a third processor configured to move or change a shape of the center region in response to a change in an attitude of the host vehicle and/or a change in a traveling environment.

11. The vehicle detecting device according to claim 10, wherein
the second processor is configured to hold a determination standard that states that a luminous point having a brightness, a size, and a color that correspond to those of a tail lamp of a preceding vehicle or a headlamp of an oncoming vehicle represents a front vehicle.

12. The vehicle detecting device according to claim 11, wherein
the determination standard further includes an amount of movement and/or an existing duration of a luminous point.

13. The vehicle detecting device according to claim 11, wherein
the determination standard does not include pairness of luminous points, a brightness gradient within a luminous point, or a shape of a luminous point.

* * * * *